US012462284B2

(12) United States Patent
Coutu

(10) Patent No.: US 12,462,284 B2
(45) Date of Patent: Nov. 4, 2025

(54) TERMINAL AND USER INTERFACE METHODS FOR FACILITATING TRANSACTIONS

(71) Applicant: Access Credit Leasing Inc., Saint-Jean-sur-Richelieu (CA)

(72) Inventor: Michel Coutu, Montreal (CA)

(*) Notice: Subject to any disclaimer, the term of this patent is extended or adjusted under 35 U.S.C. 154(b) by 186 days.

(21) Appl. No.: 17/976,616

(22) Filed: Oct. 28, 2022

(65) Prior Publication Data

US 2024/0144332 A1 May 2, 2024

(51) Int. Cl.
*G06Q 30/0601* (2023.01)
*G06Q 20/20* (2012.01)

(52) U.S. Cl.
CPC ....... *G06Q 30/0601* (2013.01); *G06Q 20/206* (2013.01); *G06Q 30/0609* (2013.01); *G06Q 30/0641* (2013.01)

(58) Field of Classification Search
CPC .. G06Q 30/0641–0643; G06Q 30/0605–0609; G06Q 30/0611–0613; G06Q 30/0633–0637; G06Q 20/40; G06Q 30/0607–0609; G06Q 30/0645
USPC ................................. 705/27.1–27.2
See application file for complete search history.

(56) References Cited

U.S. PATENT DOCUMENTS 7,780,081 B1 * 8/2010 Liang ................. G06Q 30/0633
235/383

2011/0116766 A1 * 5/2011 Sie ......................... H04N 7/163
386/249
2012/0036220 A1 * 2/2012 Dare ........................ G06F 8/61
709/217

(Continued)

OTHER PUBLICATIONS

Doshi, J., et al. "Fraud Detection System in Self-Checkout Centres," 4th Biennial International Conference on Nascent Technologies in Engineering (ICNTE), NaviMumbai, India, pp. 1-6, doi: 10.1109/ICNTE51185.2021.9487671. (Year: 2021).*

(Continued)

*Primary Examiner* — Yogesh C Garg
*Assistant Examiner* — Katherine A Barlow
(74) *Attorney, Agent, or Firm* — Wolf, Greenfield & Sacks, P.C.

(57) ABSTRACT

An interactive terminal, comprising: a camera; a document capture system; an input-output interface; a display; a loudspeaker; a network interface; and a processing entity. The processing entity is configured for: transmitting a document captured by the document capture system to a remote server via the network interface; guiding a user through a transaction sequence that includes steps during which the user provides requested input via the input-output interface and steps during which the interactive terminal provides the user with audiovisual playback via the display and the loudspeaker; taking in-progress images of the user with the camera during the transaction sequence, the in-progress images used for validation of continued physical proximity of the user to the interactive terminal during the transaction sequence; and, in response to the validation being successful, proceeding to digital signing of documents via the input-output interface to complete the transaction. Certain embodiments disclosed herein contribute to making transactions more secure and efficient.

24 Claims, 16 Drawing Sheets

(56) References Cited

U.S. PATENT DOCUMENTS

| | | | | |
|---|---|---|---|---|
| 2015/0088698 A1* | 3/2015 | Ackerman | ......... | G06Q 30/0637 |
| | | | | 705/26.82 |
| 2015/0269621 A1* | 9/2015 | Wilson | ............... | G06Q 10/0833 |
| | | | | 705/14.62 |
| 2017/0358024 A1* | 12/2017 | Mattingly | ............... | G06F 3/041 |
| 2020/0404054 A1* | 12/2020 | Avrahami | ............. | H04L 65/611 |
| 2022/0382504 A1* | 12/2022 | Cioarga | .................. | G06F 3/147 |
| 2023/0027382 A1* | 1/2023 | Akutsu | ................ | G06Q 20/208 |

OTHER PUBLICATIONS

Hauser, M., et al. "Towards Digital Transformation in Fashion Retailing: A Design-Oriented IS Research Study of Automated Checkout Systems." Bus Inf Syst Eng 61, 51-66. https://doi.org/10.1007/s12599-018-0566-9 (Year: 2019).*

\* cited by examiner

| Capital loan amount | Periodic payment amount | Predefined payment period | Number of payments / term | Interest rate |
|---|---|---|---|---|
| 1202 | 1204 | 1206 | 1208 | 463 |
| $7,500 | $448 | monthly | 48 | 22.99% |
| fixed | free | fixed | fixed | |

TERMINAL AND USER INTERFACE METHODS FOR FACILITATING TRANSACTIONS

FIELD

The present disclosure relates to a terminal and automated user interface methods for facilitating transactions, in particular in the context of leasing vehicles, equipment or other goods.

BACKGROUND

The leasing industry is a key component of the commercial ecosystem, and typically involves lessors (dealers), lessees (consumers) and financial institutions (lenders). The advent of the Internet has dramatically transformed this industry, giving consumers the ability to browse vehicles, equipment or other products offered by dealers without leaving the comfort of their own homes. Consumers can with similar ease compare rates and terms offered by lenders before making a final decision about an asset of which they wish to avail themselves.

From the point of view of the dealer, however, such new consumer behavior comes at a price, as it turns out to be difficult to consummate a lease purely online. In particular, because consumers spend more time browsing, they tend to come in less often to physically view inventory on the premises, leading to fewer impulsive transactions and therefore less business for the dealer. On the other hand, when consumers do come in to see a dealer, they face an antiquated process of credit checking and employment income verification, which requires participation from the lender and is therefore typically only done during regular business hours. This makes the process lengthy and frustrating for consumers, leading, again, to fewer transactions being completed and less business for the dealer. Furthermore, the personnel required both at the dealer and the lender to carry out the various checks and verifications is additionally taxing.

Other disadvantages arise in the current approach to leasing vehicles, equipment and other goods. For example, an inherent lack of trust may exist between the consumer and the dealer, particularly in the case of previously owned assets (such as used cars). This leads to reluctance on the part of the consumer to provide their personal information to the dealer, even though the consumer might have no problem providing it to a financial institution (such as the lender). Additionally, due to the requirement for the consumer to be advised of certain legal aspects of a lease contract, unscrupulous consumers not willing to follow through with their financial obligations may later claim that the full extent of such legal aspects were not properly explained to them by the dealer ab initio, creating a loss or liability for the dealer and the lender alike.

In view of the foregoing, a need exists to make the leasing process more efficient and robust for the benefit of consumers, dealers and lenders.

SUMMARY

Certain embodiments disclosed herein contribute to making transactions more efficient and less human resource intensive. In particular, for transactions involving a lessor, a lessee and a dealer, there is provided a terminal that guides the lessee throughout a transaction sequence that involves a credit worthiness verification being done based on information provided directly by the lessee rather than by the merchant on behalf of the lessee. This makes the transaction more secure because the lessee does not provide sensitive information to the merchant and therefore there need not be a trust relationship between the lessee and the merchant. This also makes the transaction more rapid because it does not require human resources at the merchant or at the lessor to do the credit worthiness verification. Moreover, the use of a terminal under control of the lessor allows the lessor to guarantee ensure that the lessee is made aware of contractual elements, making the process of contractual acceptance more secure and less likely to be contested. This is another way in which the transaction process can be made more secure. Various technological measures can be used to render the transaction even more secure and/or efficient, including presenting videos in such a way as to increase the chances that the videos were seen and heard, as well as taking images of the user at various times and comparing them to one another or to images initially taken. This results in transactions being concluded in an automated fashion, faster and with less human resources spent, and can even be done during times when nobody associated with the lender is physically working or even awake, such as nights and/or weekends.

Therefore, according to a first broad aspect, there is provided an interactive terminal, comprising: a camera for taking images of a user of the interactive terminal; a document capture system for receiving identity documentation from the user; an input-output interface to allow the user to enter information; a display; a loudspeaker; a network interface configured for communication with a remote computing entity; and a processing entity operatively coupled to the camera, the document capture system, the input-output interface, the display, the loudspeaker and the network interface. The processing entity is configured for: transmitting a document captured by the document capture system to a remote server via the network interface; guiding the user through a transaction sequence, the transaction sequence including steps during which the user provides requested input via the input-output interface and steps during which the interactive terminal provides the user with audiovisual playback via the display and the loudspeaker; taking in-progress images of the user with the camera during the transaction sequence, the in-progress images used for validation of continued physical proximity of the user to the interactive terminal during the transaction sequence; and in response to the validation being successful, proceeding to digital signing of documents via the input-output interface to complete the transaction, otherwise aborting the transaction.

According to another board aspect, there is provided a method of operating a terminal, comprising: transmitting a document captured by the terminal to a remote server via the network interface; guiding a user of the terminal through a transaction sequence, the transaction sequence including steps during which the user provides requested input via an input-output interface and steps during which the interactive terminal provides the user with audiovisual playback via a display and a loudspeaker; taking in-progress images of the user during the commercial transaction sequence, the in-progress images used for validation of continued physical proximity of the user to the interactive terminal during the transaction sequence; and in response to the validation being successful, proceeding to digital signing of documents via the input-output interface to complete the transaction, otherwise aborting the transaction.

According to a further broad aspect, there is provided a computer-implemented user interface method for validating user presence during a transaction, comprising: capturing (i) an identity of a user of an electronic device and (ii) an initial image of the user; guiding the user through a transaction sequence, the transaction sequence including steps during which the user provides requested input into the device and steps during which the electronic device provides the user with audiovisual playback for consumption by the user; taking in-progress images of the user during the transaction sequence; validating continuous physical proximity of the user to the electronic device during the commercial transaction sequence; and in case the validating is a success, proceeding to digital signing of documents to complete the transaction, otherwise aborting the transaction.

According to another broad aspect, there is provided a non-transitory computer-readable storage medium storing computer-readable instructions which, when read by at least one processor, cause the at least one processor to carry out a user interface method for validating user presence during a transaction, the method comprising: capturing (i) an identity of a user of an electronic device and (ii) an initial image of the user; guiding the user through a transaction sequence, the transaction sequence including steps during which the user provides requested input into the device and steps during which the electronic device provides the user with audiovisual playback for consumption by the user; taking in-progress images of the user during the transaction sequence; validating continuous physical proximity of the user to the electronic device during the transaction sequence; and in case the validating is a success, proceeding to digital signing of documents to complete the transaction, otherwise aborting the transaction.

According to a still further broad aspect, there is provided a method of operating at least one computer to facilitate product leasing, the method comprising: receiving an identity of a user of an electronic device; determining a credit worthiness of the user by accessing a data network based on the identity of the user; obtaining via a user interface of the electronic device, a price of a product offered by a merchant and a proposed down payment; determining a payment plan for the user to lease the product, based at least in part on a capital loan amount and the credit worthiness of the user, the capital loan amount being determined from the price of the product and the proposed down payment; providing the user with an option to change at least one parameter of the payment plan via the user interface of the electronic device and to accept, via the user interface of the electronic device, the payment plan or a revised version of the payment plan if at least one parameter of the payment plan was changed via the user interface of the electronic device; and upon acceptance of the payment plan by the user via the user interface of the electronic device, generating contract documentation for digital signature by the user and the merchant via the user interface of the electronic device and, upon digital signature of the contract documentation by the user and the merchant via the user interface of the electronic device, causing funds to be transferred to the merchant.

According to another broad aspect, there is provided a non-transitory computer-readable storage medium storing computer-readable instructions which, when read by at least one processor, cause the at least one processor to carry out a method that comprises: receiving an identity of a user of an electronic device; determining a credit worthiness of the user by accessing a data network based on the identity of the user; obtaining via a user interface of the electronic device, a price of a product offered by a merchant; determining a payment plan for the user to lease the product, based at least in part on the price of the product and the credit worthiness of the user; providing the user with an option to change at least one parameter of the payment plan via the user interface of the electronic device and to accept, via the user interface of the electronic device, the payment plan or a revised version of the payment plan if at least one parameter of the payment plan was changed via the user interface of the electronic device; and upon acceptance of the payment plan by the user via the user interface of the electronic device, generating contract documentation for digital signature by the user and the merchant via the user interface of the electronic device and, upon digital signature of the contract documentation by the user and the merchant via the user interface of the electronic device, causing funds to be transferred to the merchant.

BRIEF DESCRIPTION OF THE DRAWINGS

These and other aspects will now be described with reference to the accompanying drawings, in which:

FIG. 12 illustrates a data structure corresponding to a payment plan, in accordance with a non-limiting embodiment.

FIG. 13 depicts a user interface on the screen of the terminal allowing the user to select among alternative lenders through interaction with the screen.

It should be understood that the drawings are referred to merely as an aid in understanding aspects of the present disclosure and are not to be considered limiting.

DETAILED DESCRIPTION OF EMBODIMENTS

Figure 1:
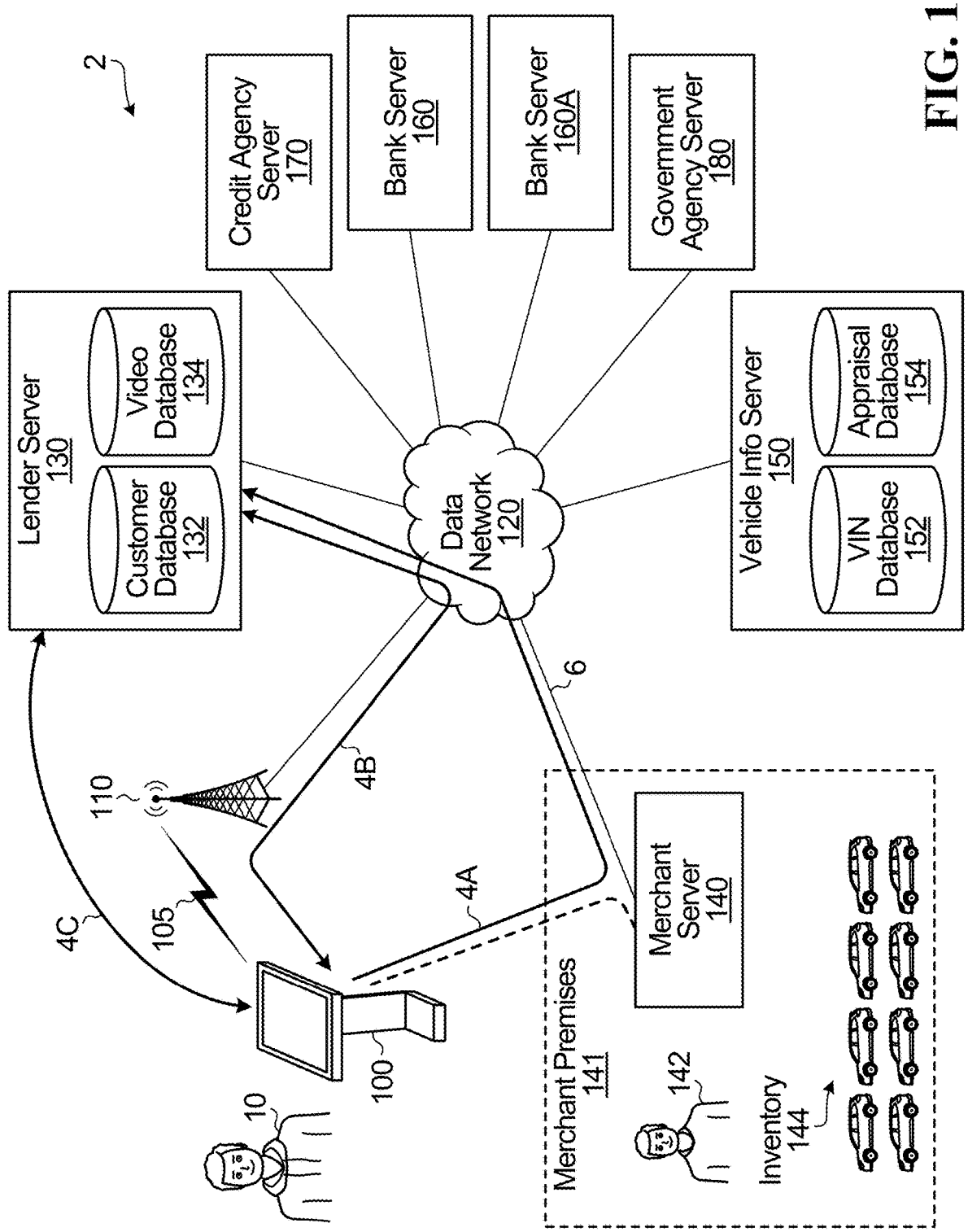
FIG. 1 shows a network architecture for facilitating leasing of an asset by a user of an interactive terminal, in accordance with a non-limiting embodiment.

Reference is made to FIG. 1, which shows a network architecture 2 for facilitating leasing of an asset by a user 10 of an interactive terminal 100. The terminal 100 may be located on the premises 141 of a merchant (a commercial entity also sometimes referred to as a "dealer") that provides or showcases a plurality of assets for lease by consumers (such as the user 10). For the purposes of simplifying the present disclosure, the assets are vehicles, although this is not to be considered a requirement. Alternative examples of assets that may be subject to the notions disclosed herein include any assets that could form the basis of a secured or collateralized loan of the underlying asset, including tangible assets (such as equipment, furniture and appliances) and intangible assets (such as real estate), to name a few non-limiting possibilities.

In some situations, the vehicles available for lease may be in the merchant's inventory 144 and capable of being physically viewed, accessed or consulted by consumers on the merchant's premises 141. In other situations, the terminal 100 may provide a virtual display of the vehicles for consultation or browsing by users via a screen. In still other situations, a hybrid model may be adopted, whereby some or all of the vehicles are in inventory 144 on the merchant's premises 141 and some or all of the vehicles are accessible through a browsing feature of the terminal 100.

The merchant is associated with a merchant server 140 that is connected to a data network 120. The data network 120 could include or traverse, for example, the Internet, a local area network, a wide area network and/or a wireless network. The data network 120 may comprise copper transmission cables, optical transmission fibers, wireless transmission, routers, firewalls, switches, gateway computers and/or edge servers. The merchant server 140 may be configured to carry out functions such as validating pricing queries received from other servers connected to the data network 120. To reach the data network 120, the merchant server 140 may be connected via one or more communication links 6, which may include a wireless link established with a radio frequency transceiver device, such as a WiFi wireless access point or a cellular telecommunications antenna. In other examples, the merchant server 140 may access the data network 120 over a coaxial cable, twisted pair or Ethernet medium.

The terminal 100 at the merchant's premises 141 is configured to communicate with a lender server 130, which is also connected to the data network 120. Both the lender server 130 and the terminal 100 may be administered by a lender (e.g., a type of financial institution) and they may each run cooperating and/or complementary software applications that communicate with one another over an end-to-end logical connection. This logical connection between the terminal 100 and the lender server 130 may be established via the merchant server 140 or it may be consist of an independent connection between the terminal 100 and the lender server 130.

In the case where the terminal 100 and the lender server 130 are connected via the merchant server 140 on the merchant's premises 141 (i.e., the terminal 100 is communicatively coupled to the merchant server 140), the same data connection 6 used by the merchant server 140 to access the data network 120 may also be used by the terminal 100 to access the data network 120 and therefore establish a logical connection 4A with the lender server 130.

In other embodiments, particularly where added security is desired, the terminal 100 may be configured to establish a separate, independent logical connection 4B to the data network 120. This separate connection may involve a wireless link 105 established with a radio frequency transceiver device 110, such as a wireless access point or a telecommunications antenna, which is connected to the data network 120. Alternatively, a logical connection 4C between the terminal 100 and the lender server 130 may be established in an out-of-band manner, i.e., not involving the data network 120 (e.g., over a dedicated point-to-point link, using satellite transceivers, etc.). Of course, various other configurations for establishing a logical connection between the lender server 130 and the terminal 100 are possible.

Figure 3:
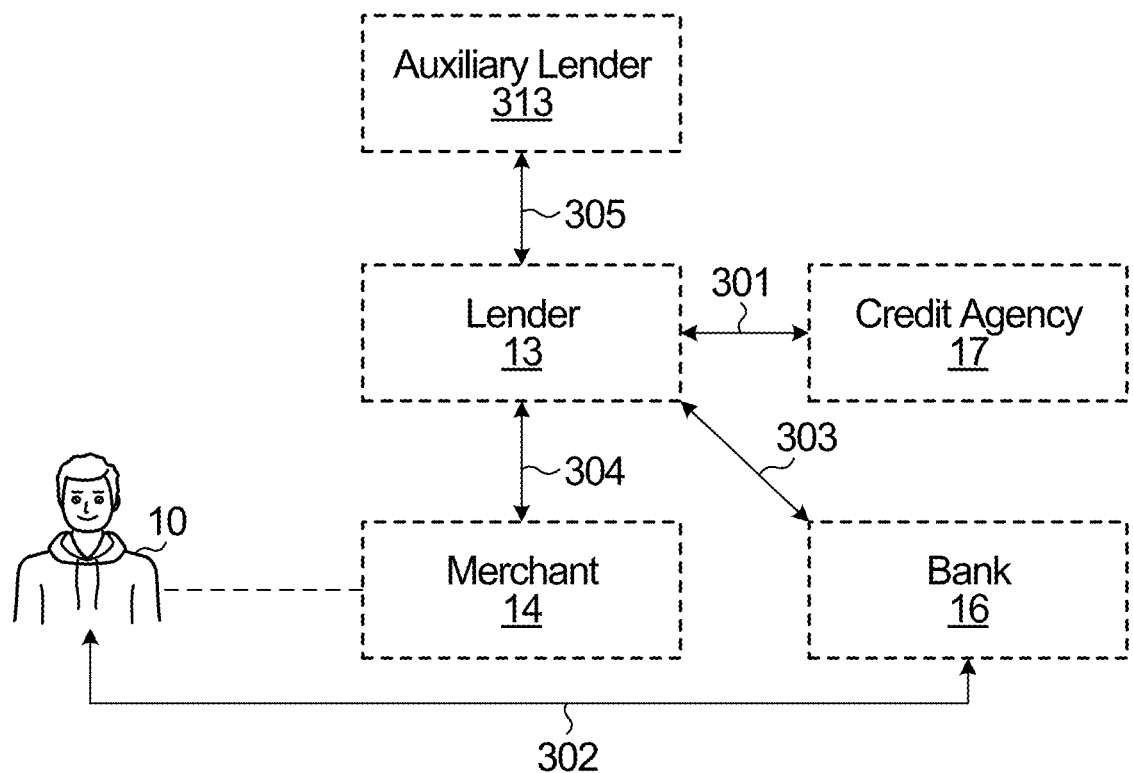
FIG. 3 is a conceptual diagram illustrating trust relationships between different pairs of entities in the network architecture of FIG. 1, in accordance with a non-limiting embodiment.
Figure 4A:
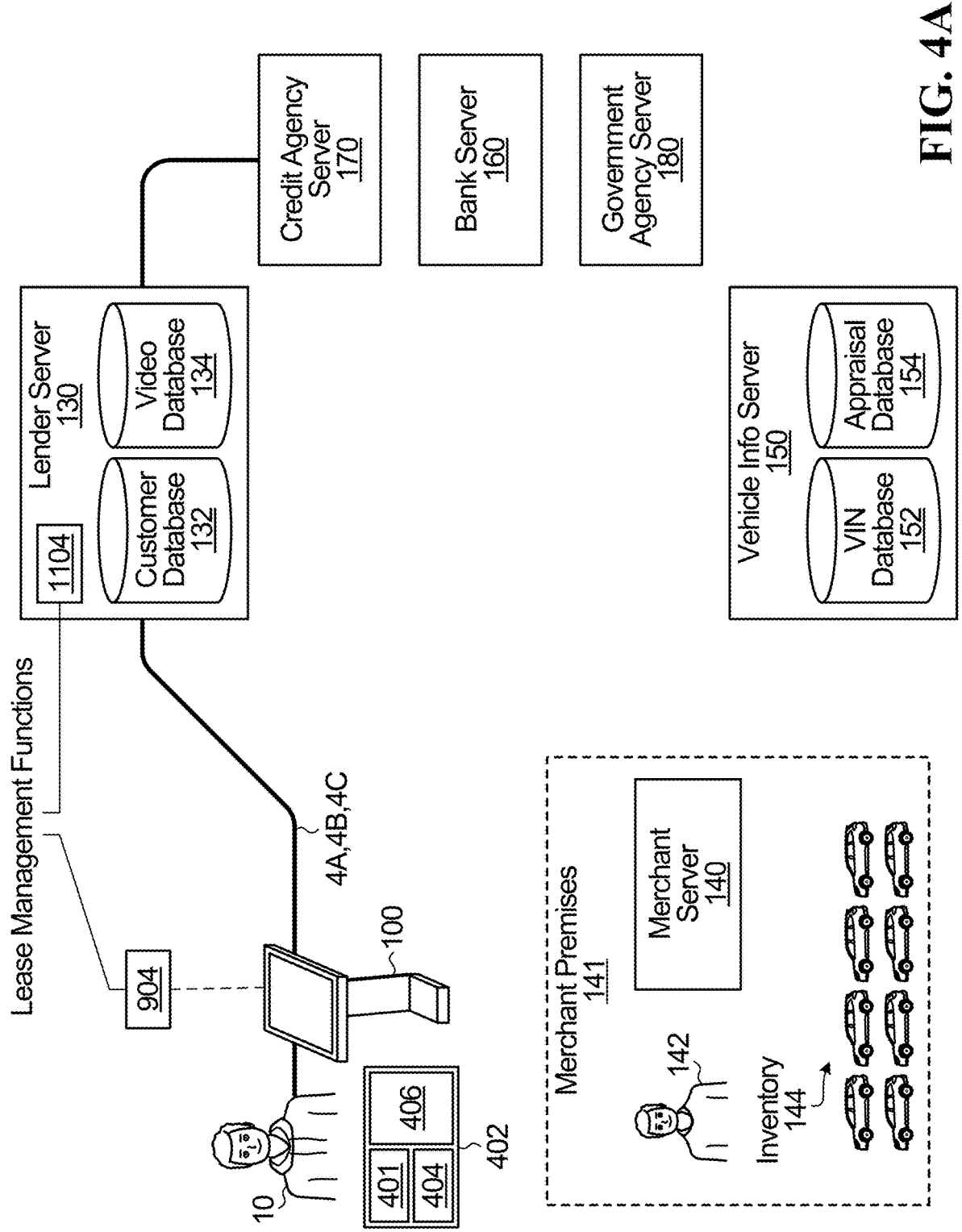
FIGS. 4A-4F are signal flow diagrams showing steps in a process of leasing an asset using the interactive terminal in the network architecture of FIG. 1, in accordance with a non-limiting embodiment.
Figure 4B:
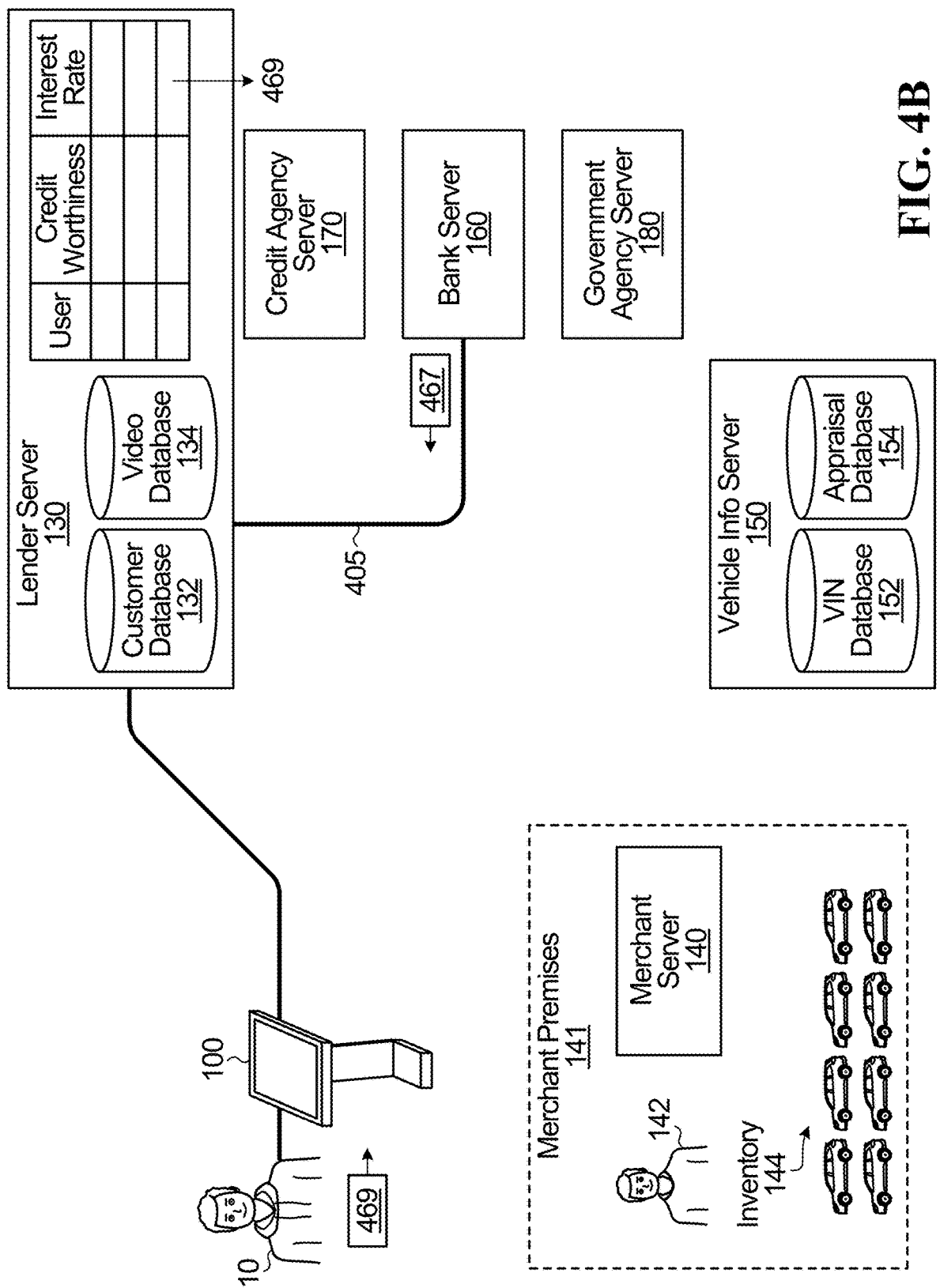
Figure 4C:
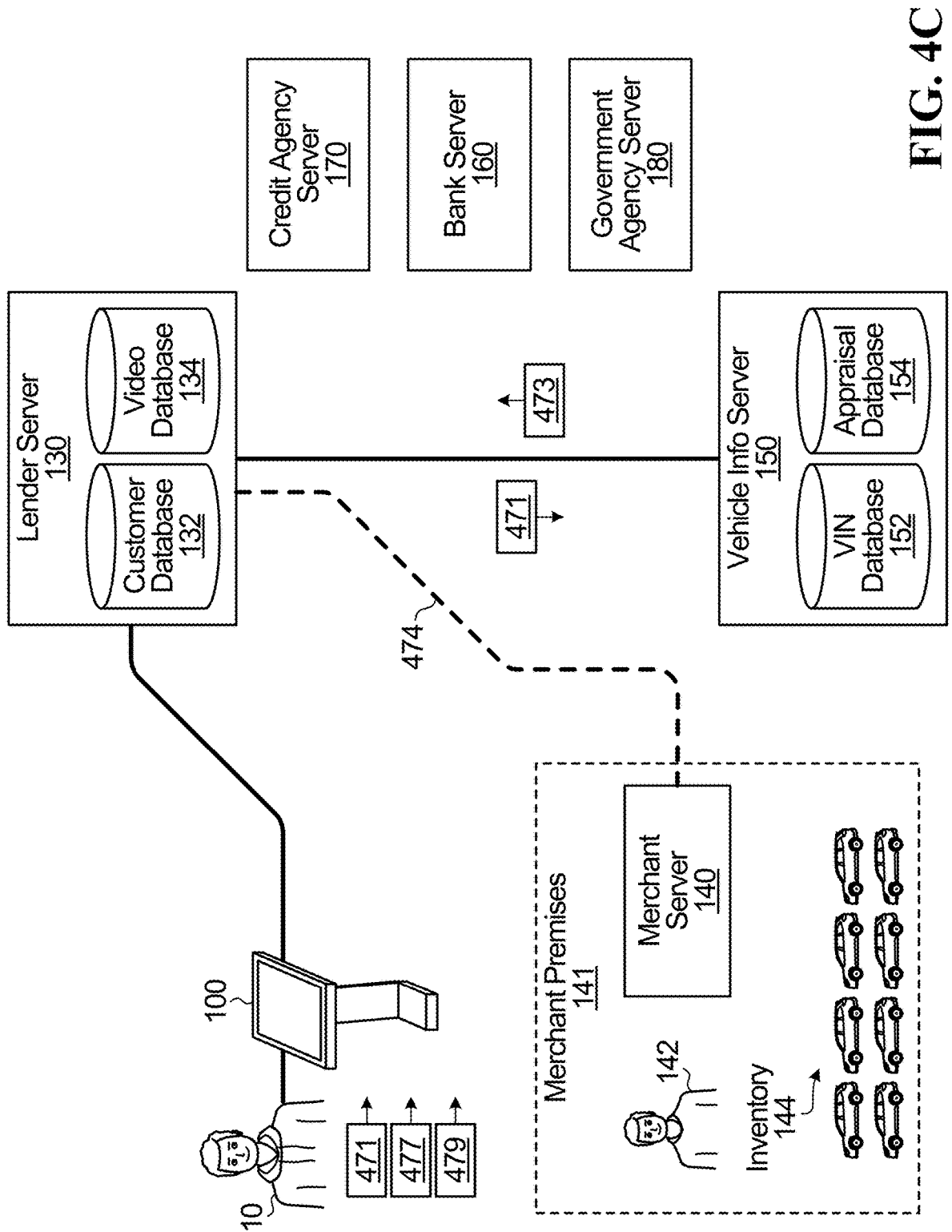
Figure 4D:
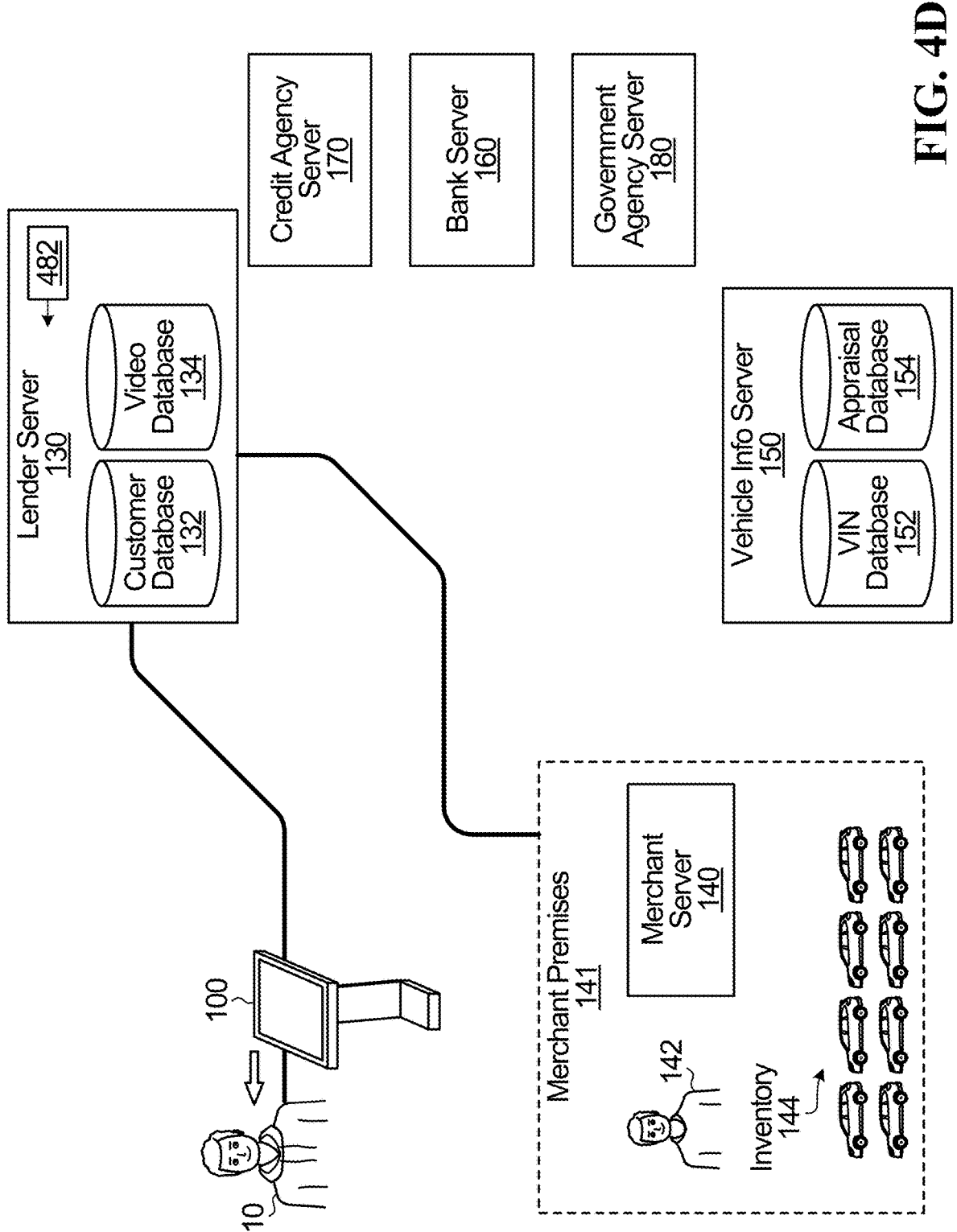
Figure 4E:
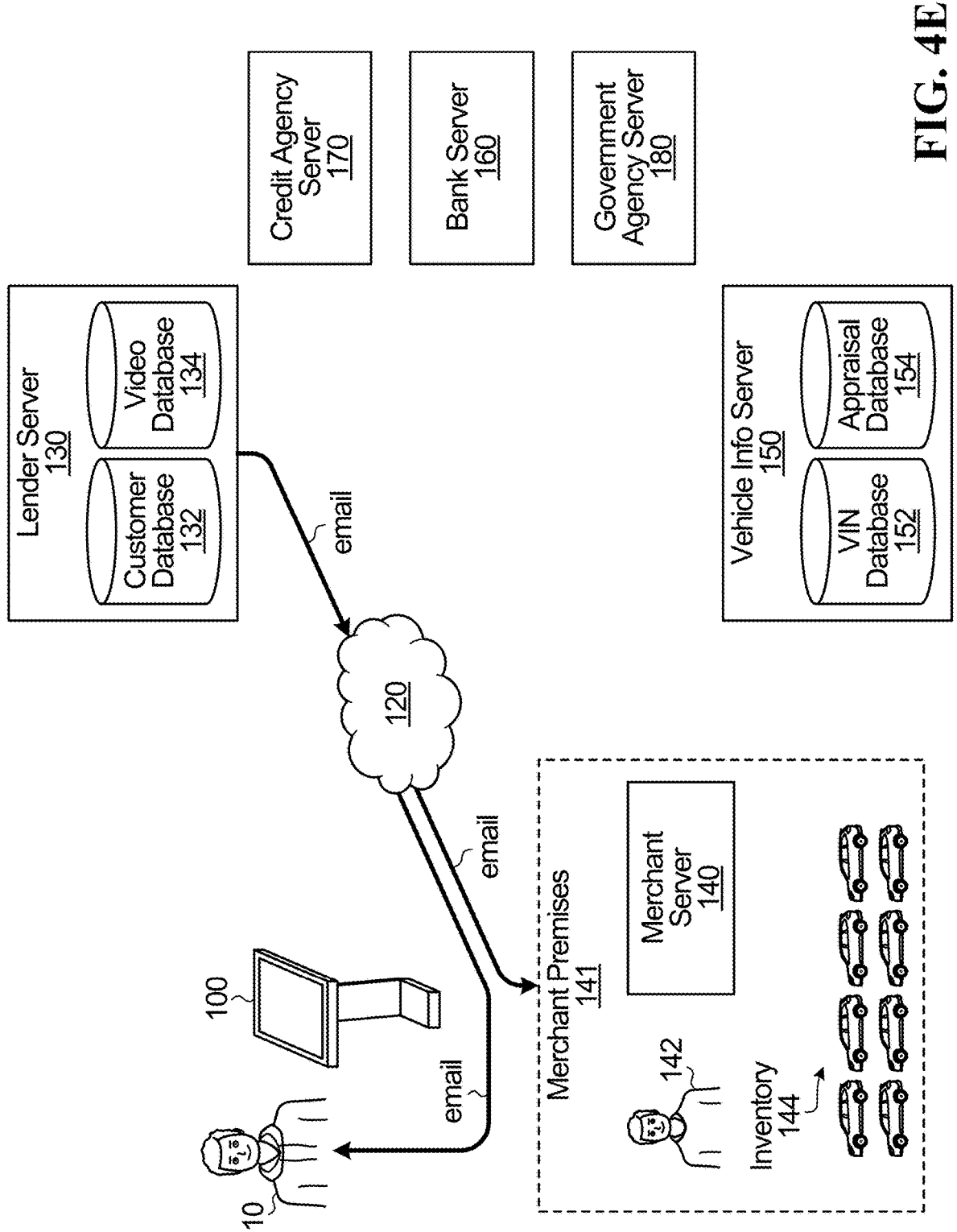
Figure 4F:
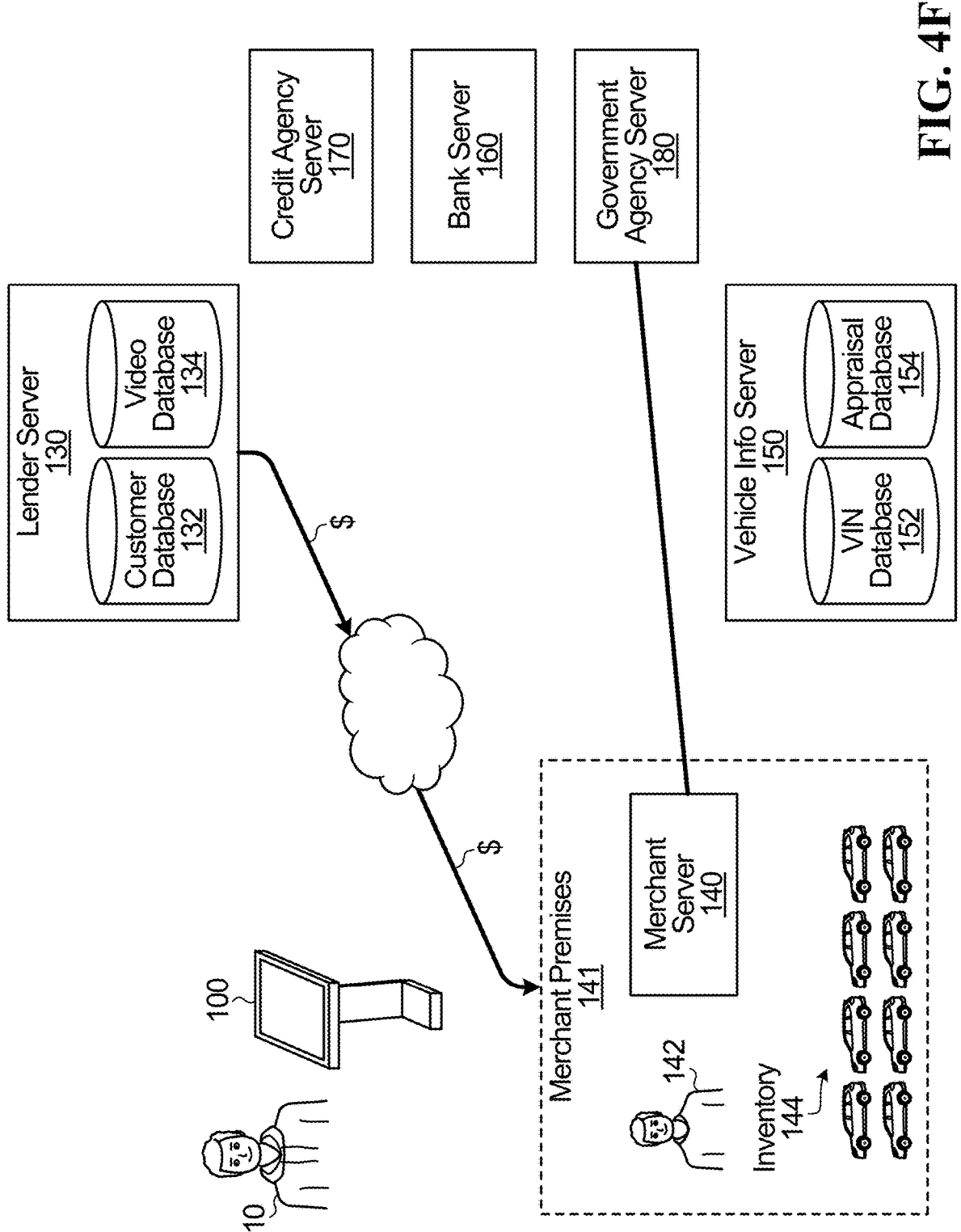
Figure 7:
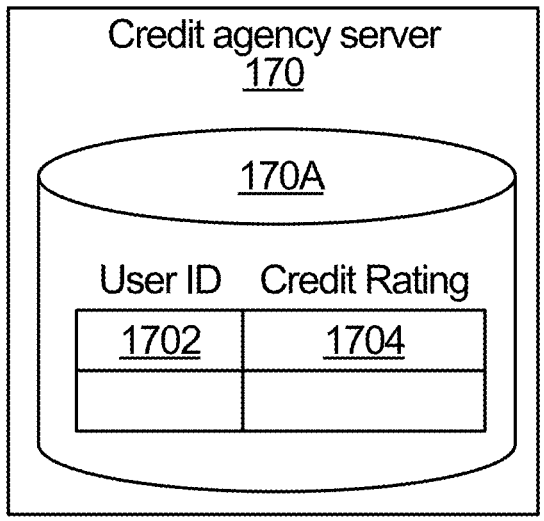
FIG. 7 shows a non-limiting example of a database stored or accessed by a credit agency server.

Other servers may be connected to the data network 120 and are used at different stages of the leasing process. These may include:

A credit agency server 170 (under the control of a credit agency). The credit agency maintains a database 170A of credit scores for various users. The credit agency server 170 may be configured to calculate the credit score or rating for the users and maintain these scores in the database 170A. As shown in the non-limiting example of FIG. 7, the database 170A includes a data structure that may comprise a plurality of records each with a user ID field 1702 and a credit rating field 1704. The credit agency server 170 is configured to respond to requests from the lender server 130 for credit information about a user (such as the user 10) based on an identity of the user (such as the user's name, address, social insurance number or other information). Because of the sensitive nature of the information being released to the lender server 130, a pre-existing trust relationship should exist between the lender and the credit agency. This can help in terms of compliance with privacy laws and general security-related best practices. FIG. 3 shows the trust relationship 301 existing between the lender 13 and the credit agency 17, as well as pre-existing trust relationships between other pairs of entities in the network architecture of FIG. 1.

One or more bank servers 160, 160A (under control of respective banks). The bank servers 160, 160A represent banks where various users (such as the user 10) do business in the course of their daily lives, e.g., where they deposit their pay and from where they make purchases. Pre-established trust relationships are assumed to exist between the banks and their customers. In this case, as illustrated in FIG. 3, the user 10 has a pre-existing trust relationship 302 with bank 16.

Figure 8:
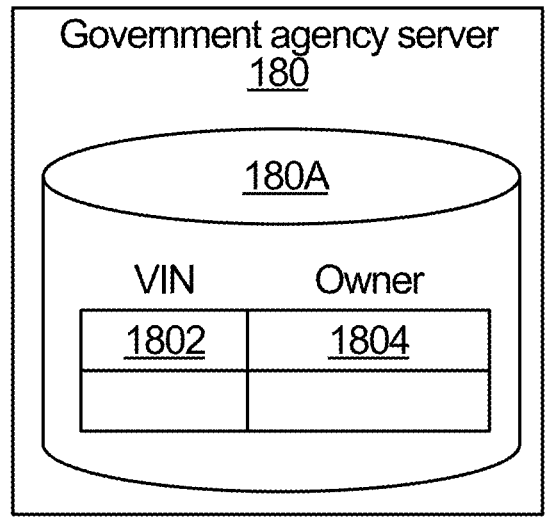
FIG. 8 shows a non-limiting example of a database stored or accessed by a government agency server.

A government agency server 180 (under control of a government agency such as a department of motor vehicles). The government agency server 180 maintains a database 180A of vehicle identification numbers and associates them with registered owners (or lessees, in the case of leased vehicles). As shown in the non-limiting example of FIG. 8, the database 180A includes a data structure which may comprise a plurality of records each with a VIN field 1802 and an owner field 1804. The government agency server 180 may be called upon to register a particular user (such as the user 10) in connection with a particular VIN at the end of the leasing process. Access to the government agency server 180 may be a publicly available service and thus a pre-established trust relationship with the government agency is not required.

A vehicle information server 150 (under control of a vehicle information provider). The vehicle information server 150 may include a VIN database 152 and an appraisal database 154. The VIN database 152 stores a data structure that maps each of a set of VINs to a year, make and model of a vehicle having that VIN. The appraisal database 154 stores a data structure that maps a set of vehicle identifying characteristics (e.g., year, make, model, trim, condition, accessories) to a market value, which can include a past market value, a current market value and a projected market value into the future. In some embodiments, the VIN database 152 and the appraisal database 154 may be accessed through separate servers reachable over the data network 120, and each such database may be under the control of separate vehicle information providers. Access to the VIN database 152 and to the appraisal database 154 may be a publicly available service and thus a pre-established trust relationship with the vehicle information provider is not required.

As shown in FIG. 3, other trust relationships may also need to be established ahead of the lending process. For example, that may be the case with the trust relationship 303 between the lender 13 and the user's bank 16, as well as between the lender and the merchant. The trust relationship 303 between the lender 13 and the user's bank 16 will allow for the lender 13 to access (with the user's permission) income and expense information stored by the user's bank 16. The trust relationship 304 between the lender 13 and the merchant 14 can often be in place as a result of by the fact that the terminal 100 is installed on the merchant's premises 141. In order to allow this to happen, the lender 13 would need permission from the merchant 14, which implies existence of a pre-existing trust relationship.

Figure 2:
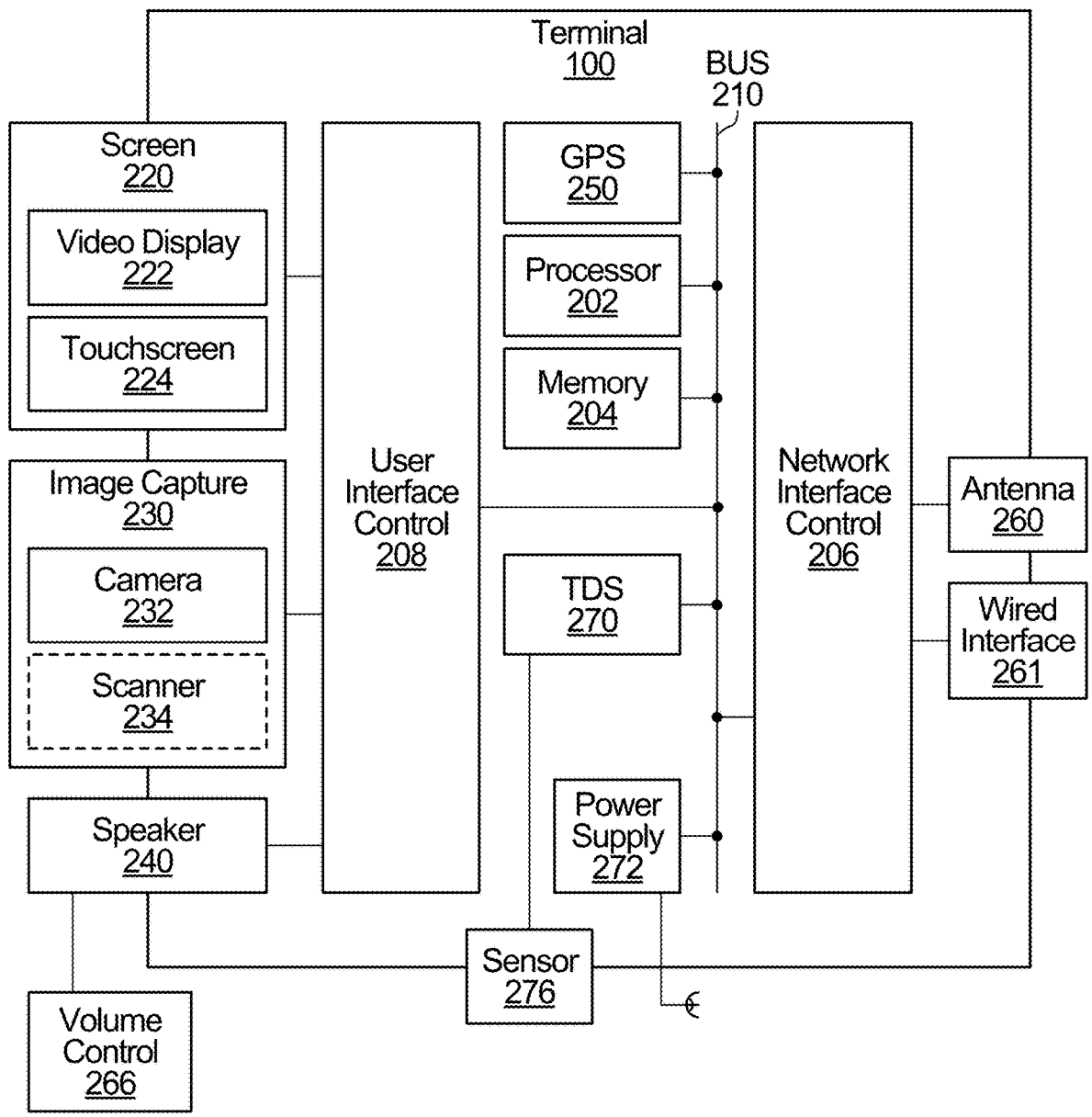
FIG. 2 is a block diagram showing various components of the interactive terminal in FIG. 1, in accordance with a non-limiting embodiment.

Reference is now made to FIG. 2, which is a block diagram showing various components of the terminal 100, in accordance with a non-limiting example embodiment. In some embodiments, the terminal 100 can be implemented as a stand-alone kiosk-type interactive terminal that is relatively unmovable (e.g., it may be secured to the floor of the merchant's premises 141 or simply too heavy to move). In other embodiments, the terminal 100 may be a portable or handheld terminal, with a housing (not shown) that may be securely tethered to the merchant's premises 141 by a cut-resistant wire.

The terminal 100 includes a processor 202 coupled via a bus 210 to a computer-readable storage medium 204 (e.g., a memory), a user interface controller 208 and a network interface controller 206. The bus 210 electrically and communicatively links the aforementioned components to one another. The computer-readable storage medium 204 may store data and code (computer-readable instructions). Accordingly, the computer-readable storage medium 204 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium 204 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The program instructions can be downloaded to the computer-readable storage medium 204 of the terminal 100 from an external computer or external storage device via a network (e.g., the data network 120). The program instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the program instructions by utilizing state information to personalize the electronic circuitry, in order to carry out aspects of the present disclosure.

Figure 9:
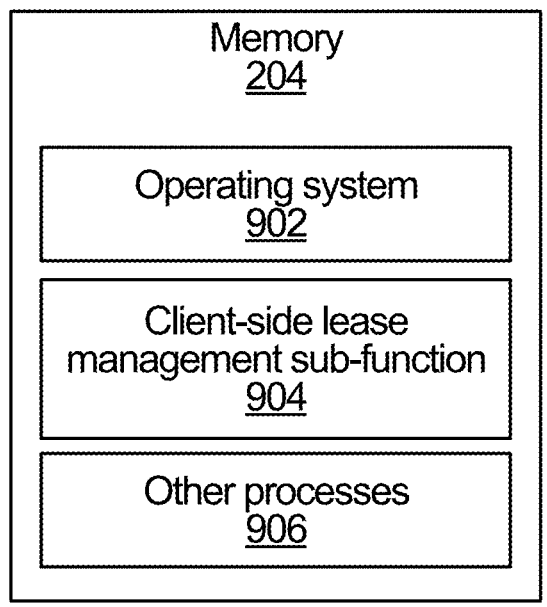
FIG. 9 conceptually illustrates processes that may be encoded in computer-readable instructions stored in the non-transitory memory of the terminal.

With additional reference to FIG. 9, the processor 202 may be configured to read and execute the computer-readable instructions in the memory 204 to carry out a variety of processes including an operating system 902, a client-side lease management sub-function 904 and other processes 906. The network interface controller 206 is coupled to an antenna 206, which allows the terminal 100 to communicate with other entities over a wireless medium (e.g., radio frequency waves). Such other entities could include a cell tower, a WiFi hotspot or a satellite, and may include transceiver device 110. Alternatively or in addition, the network interface controller 260 is coupled to a wired interface 261 such as a coaxial cable interface, an Ethernet interface or a twisted pair interface.

The user interface controller 208 is connected to various user-side input devices, output devices or input-output devices. For example, the input devices could include image capture devices 230 such as a camera 232 and a scanner 234. The output devices could include a video display 222 and a loudspeaker 240. The input-output devices could include a touchscreen 224. It is noted that the video display 222 and the touchscreen 224 may be combined on the same screen 220, with part of the screen 220 being dedicated to the (non-interactive) video display 222 and another part of the screen being comprising the touchscreen 224. Alternatively, to render the video display 222 non-interactive, interactivity of part of the touchscreen 224 can disabled.

Figure 10A:
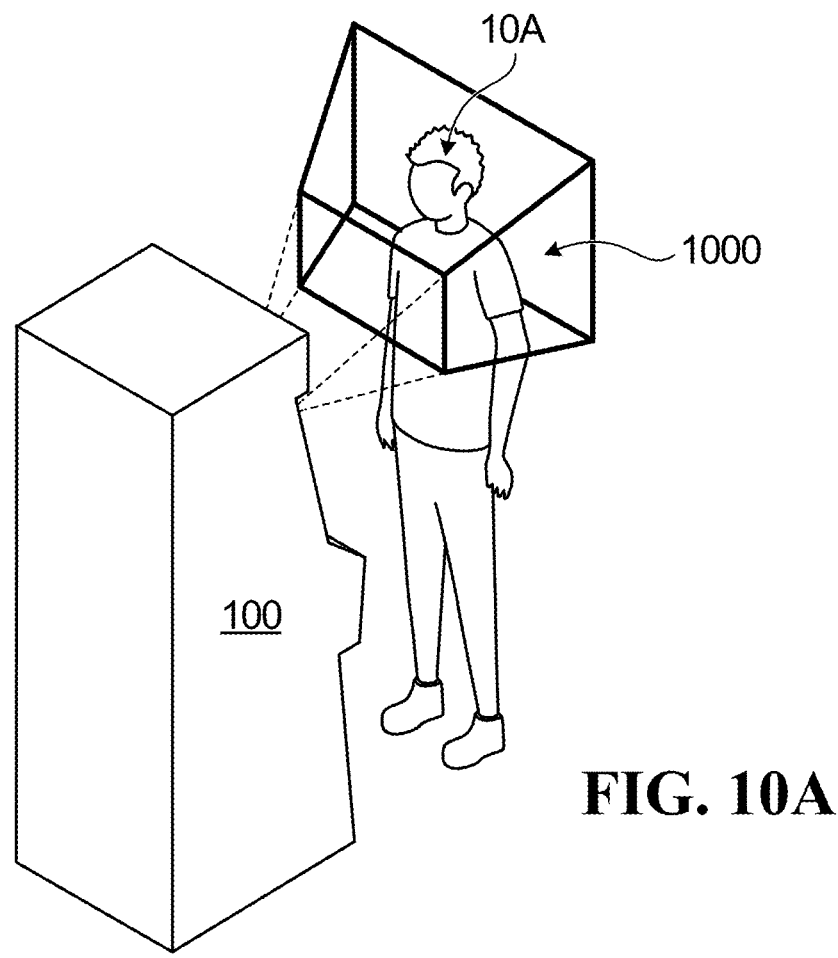
FIG. 10A depicts relative positioning of interactive terminal and the user, in accordance with a non-limiting embodiment.

In a non-limiting embodiment, with reference to FIG. 10A, the video display 222 is configured to display images that are visible to a seeing (i.e., not visually impaired) user when such user (or the user's head 10A) is in a certain range of positions (which could define an overall volume of space 1000), and the loudspeaker 224 is configured to convey sound that is audible to a hearing (i.e., not hearing impaired) user when such user is in that range of positions.

Figure 10B:
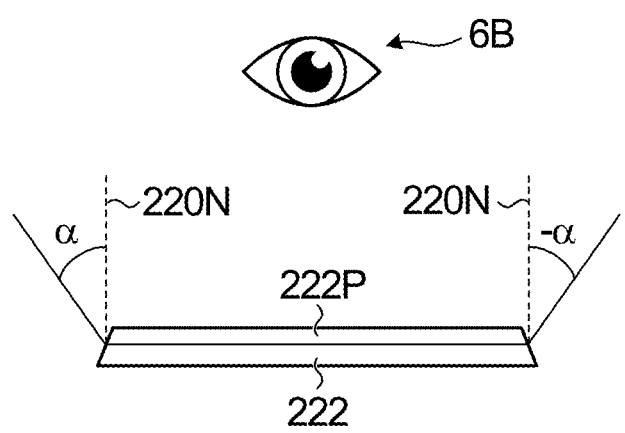
FIG. 10B is a cross-sectional side elevational view of a screen with a privacy filter overlaid thereon, in accordance with a non-limiting embodiment.

Also in a non-limiting embodiment, the video display 222 is configured to display video that is not visible to the user when the user 10 (or the user's head 10A) is outside a certain range of positions. For example, and with reference to FIG. 10B, one feature of the terminal 100 may be that the video display 222 is visible by the user 10 only when the user's eyes 10B are within a certain angular range (−a to a) relative to the normal 220N of the screen 220. To this end, the screen 220 (or at least the video display 222) may be covered by a screen privacy filter 222P, e.g., a thin layer of polarized plastic (such as polycarbonate or acrylic) that significantly reduces the viewing angle. The screen privacy filter 222P may include angled slats or panels within the material's structure, allowing light to pass through the plastic layer at only certain angles, whereas at non-ideal angles, light is either blocked or significantly attenuated. The screen privacy filter 222P may be overlaid onto the glass of the screen 222 (as shown in FIG. 10B) or may be underneath the glass of the screen in other embodiments.

The terminal 100 may be powered from a utility grid via a power cable 274. Alternatively or in addition, the terminal may include its own rechargeable power source 272 that includes at least one battery, for powering the various components of the terminal 100, either at all times (in the form of an uninterruptible power supply) or in cases where there is no power provided via the power cable (e.g., in case of a power failure).

The terminal 100 may further include a position determining system (e.g., a GPS-based system) 250 to determine its position relative to a map or grid and to send the position of the terminal 100 to the lender server 130 via the network interface controller 206.

Additionally, the terminal 100 may further comprise a tamper detection system (TDS) 270, which is configured for detecting if the terminal 100 is being tampered with, such as by opening a panel or cabinet that is otherwise supposed to be sealed or locked. To this end, the tamper detection system 270 is connected to one or more sensors 276 that may be connected to key areas of the terminal 100. The sensors 276 may be configured to detect a variety of changes, including changes in acceleration, temperature, conductance, capacitance or resistance. The tamper detection system 270 may be connected to the bus 210 and may be configured to send messages to the processor 202 over the bus 210. Such messages may be received by the processor 202, interpreted, and if necessary, an alarm can be signaled to the lender server 130. In another configuration, the tamper detection system 270 may be connected directly to a wireless network interface (such as the antenna 260) and be capable of establishing its own independent wireless link to the lender server 130 or to another entity, thereby providing an independent mechanism for detecting tampering that could detect even tampering with the processor 202.

Figure 6:
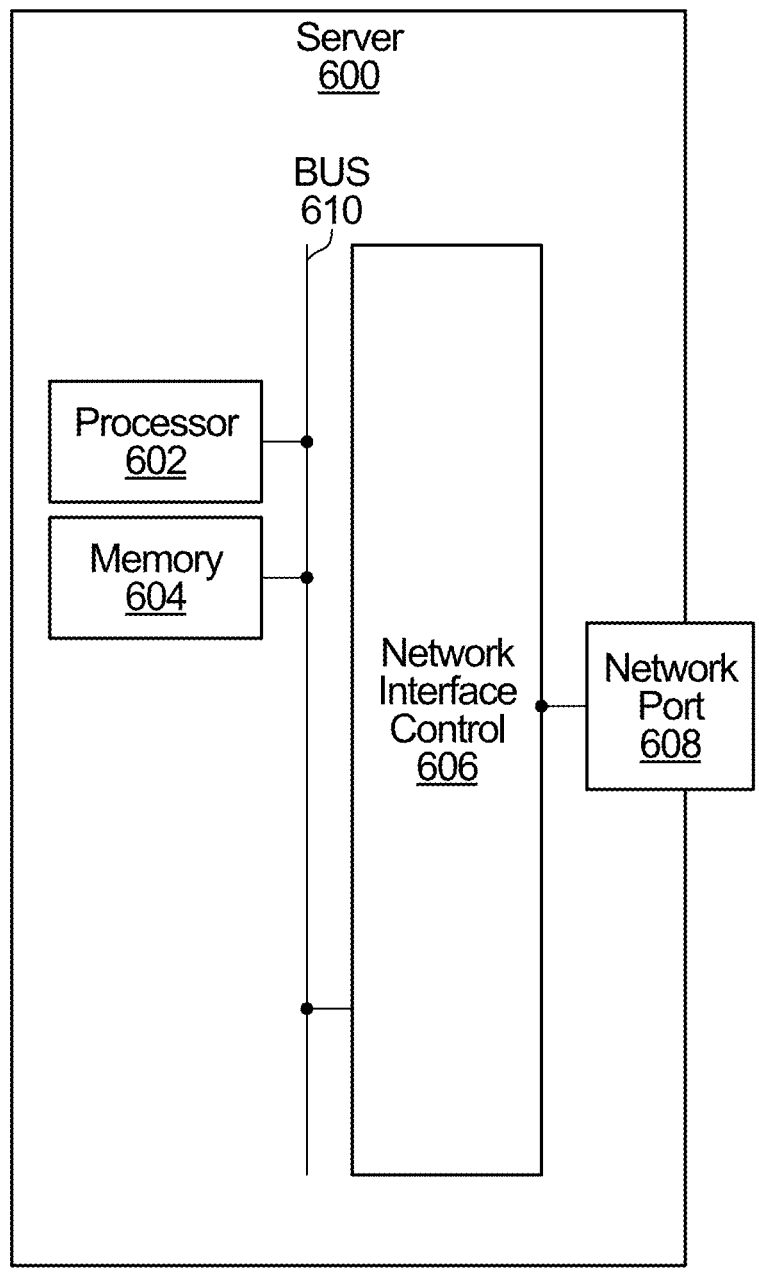
FIG. 6 is a block diagram showing various components of a server illustrative of various entities forming part of the network architecture of FIG. 1 accordance with a non-limiting embodiment.

Reference is now made to FIG. 6, which is a block diagram showing various physical components of an exemplary server 600 illustrative of various servers in the network architecture 2, such as the merchant server 140, the lender server 130, the credit agency server 170, the bank servers 160, 160A, the government agency server 180 and the vehicle information server 150. The exemplary server 600 includes a processor 602 coupled via a bus 610 to computer-readable storage medium 604 (e.g., a memory) and a network interface controller 606. The bus 610 electrically and communicatively links the aforementioned components to one another. The computer-readable storage medium 604 may store data and computer-readable instructions. Accordingly, the computer-readable storage medium 604 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The program instructions can be downloaded to the computer-readable storage medium 604 of the server 600 from an external computer or external storage device via a network (e.g., the data network 120). The program instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the program instructions by utilizing state information to personalize the electronic circuitry, in order to carry out aspects of the present disclosure.

Figure 11:
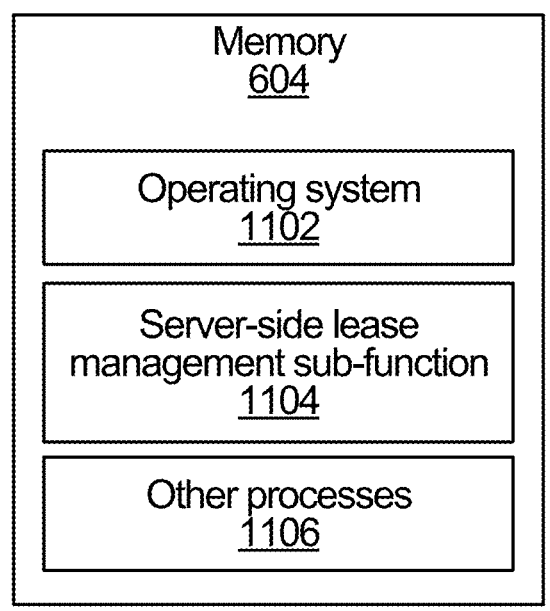
FIG. 11 conceptually illustrates processes that may be encoded in computer-readable instructions stored in the non-transitory memory of a server operated by a lender.

In the particular case of the lender server 130, and as shown in FIG. 11, the processor 602 may be configured to read and execute the computer-readable instructions to carry out a variety of processes including an operating system 1102, a server-side lease management sub-function 1104 and other processes 1106. The network interface controller 606 is coupled to an Ethernet port 608, which allows the terminal to communicate with other entities over the data network 120. Alternatively or in addition, the network interface controller 606 includes a coaxial cable interface, a twisted pair interface and/or wireless interface (such as an antenna).

Still continuing with the particular case of the lender server 130, the lender server 130 may comprise or have access (e.g., over the data network 120) to a plurality of databases, such as a customer database 132 and a videos database 134. In one scenario, the databases are stored in the memory 604 of the lender server 130. In another scenario, the customer database 132 and the videos database 134 are stored elsewhere than in the memory 604 of the lender server 130 however remain accessible to the lender server 130. The customer database 132 stores information related to various users, such as the user 10 who in the present example wishes to lease a vehicle from the merchant 14. Such information is gathered by the server-side lease management sub-function 1104 during the course of the leasing process. The videos database 134 stores videos or other audiovisual tracks that are to be played back by the server-side lease management sub-function 1104 at key moments during the leasing process.

Reference is now made to FIGS. 4A-4F, which show signal flow diagrams illustrative of a process of leasing a vehicle using the interactive terminal 100. In the following, the term "lease management function" designates a combined functionality of the terminal 100 and the lender server 130, which guides the user 10 through a commercial transaction sequence, e.g., in the context of leasing the vehicle. It should be appreciated that to this end, the lease management function may include the combined functionality of (i) the client-side lease management sub-function 904 defined by computer-readable instructions stored in the memory 204 of the terminal 100 and executed by the processing entity 202 of the terminal 100 and (ii) the server-side lease management sub-function 1104 defined by computer-readable instructions stored in the memory 604 of the lender server 130 and executed by the processing entity 602 of the lender server 130.

In order to cooperatively execute the lease management function, the client-side lease management sub-function 904 and the server-side lease management sub-function 1104 communicate over a logical connection established between the terminal 100 and the lender server 130. This could be one of the previously described logical connections 4A, 4B, 4C. The logical connection may be securely established using encryption over the same data network 120 used to interconnect the lender server 130 with other servers, such as the merchant server 140. In other embodiments, the logical connection between the client-side lease management sub-function 904 and the server-side lease management sub-function 1104 may be established via satellite over a separate network to preserve independence vis-à-vis the merchant's equipment or network.

Those skilled in the art will appreciate that the proportion of functionality of the lease management function executed by the client-side lease management sub-function 904 versus the server-side lease management sub-function 1104 may vary from one implement to the next. In some embodiments, for example, the terminal 100 may act as a "dumb console" where the client-side lease management function 904 is configured to receive commands or instructions from the server-side lease management function 1104 and execute them, and also to interact with the user 10 (via the user interface controller 208), but data gathered at the terminal 100 is immediately sent to the lender server 130 (i.e., to the server-side lease management sub-function 1104) and erased from the memory 204. This may be desirable for security reasons, such as to prevent leakage of data in case the terminal 100 is tampered with or stolen. In other embodiments, the terminal 100 may be have more "intelligence" and thus the client-side lease management sub-function 1104 may be configured to perform additional functionality (such as facial recognition, proximity validation, etc.) so as to alleviate the processing burden at the lender server 130 (and possibly shorten latency). Regardless of the distribution of responsibilities in an actual implementation, the combined functionality of the client-side lease management function 904 and the server-side lease management function 1104 can be referred to as the lease management function 904, 1104.

Assuming now that the user 10 has chosen a vehicle that they wish to lease, the user 10 approaches the terminal 100. Alternatively, the user 10 might already be positioned in front of the terminal 100 when making the choice of vehicle that they wish to lease. The lease management function 904, 1104 is configured to prompt the user 10 to submit a document 402 that includes indicia 401, the name 404 of the user 10 and an image 406 the user. Examples of a suitable document could be a government-issued document with a photo ID, such as a driver's license, health care card or passport. Once the document 402 is submitted, the scanner 234 (or other document capture system, such as the camera 232) captures the document 402 and the lease management function 904, 1104 is configured to look for the name 404 and the image 406 on the document 402. The lease management function 904, 1104 then validates the submitted document 402 by verifying that it is government-issued (based on the indicia 401), contains a name and contains an image. If this cannot be verified, the lease management function 904, 1104 may request submission of a new document, which basically amounts to starting all over again.

Assuming now that a suitable document has been submitted, from which the name 404 and the image 406 have been obtained. The lease management function 904, 1104 may also be configured to obtain additional information such as an issuance date of the document (which can be part of the indicia 401). In an embodiment, the lease management function 904, 1104 may be configured to perform optical character recognition to extract the name 404 and issuance date information. In order to help verify that the user identified on the document (by way of the name 404 and the image 406) is indeed in front of the terminal 100, the lease management function 904, 1104 is configured to cause the camera 232 to take a live image of the user 10. It is noted that the image 406 on the document 402 is an image taken in the past (e.g., around the issuance date of the document), whereas the live image (referred to as an "initial image") is an image taken in the present. The name of the user, the past image 406 and the initial image are then further processed by the lease management function 904, 1104.

Specifically, lease management function 904, 1104 is configured to compare the past image 406 and the initial image in order to ascertain whether they are of the same person, thereby confirming the identity (e.g., the name) of the user 10. Due to the passage of time, the two images may appear different even where the person is the same. The issuance date of the document 402 may provide information in relation to a time gap since the past image 406 was taken. As such, the lease management function 904, 1104 may be configured to apply an age-adjustment process to one or both of the two images to account for the time gap since when the past image 406 was taken. As such, the past image 406 may be forward-aged and/or the initial image may be reverse-aged. Various available age-adjustment technologies such as Youcam Makeup, FaceApp and others can be used. In addition, comparing the past image 406 and the initial image may require accounting for differences in facial accessory features between the two images, notably facial hair, glasses, a medical mask and makeup. Existing commercial software packages provide this capability and may be used. As a result of this process, the user's identity is either validated or not. If the user's identity cannot be validated, the lease management function 904, 1104 may be configured to abort the commercial transaction, or to prompt the user to submit another document for verification.

At this point, let it be assumed that the user's identity has been validated. The lease management function 904, 1104 is now configured to determine the credit worthiness of the user 10. This could optionally include the lease management function 904, 1104 establishing a connection 455 with the credit agency server 170 (e.g., over the data network 120), so as to obtain credit information from the credit agency 170 based on the identity of the user 10. The credit information may be packaged in a message 457 sent by the credit agency server 170 over the connection 455. The obtained credit information could be a credit score associated with the user 10, as determined and/or stored by the credit agency server. Accordingly, the credit agency server 170 may be configured to consult the database 170A on the basis of an identity of the user 10 to obtain an associated credit rating or score. The credit agency may be inclined to release such credit information about the user due to the pre-established trust relationship 301 between the lender 13 and the credit agency 17.

Determining the credit worthiness of the user 10 may also involve information obtained from a financial institution with which the user has a pre-established trust relationship (such as the bank 16, with which the user 10 has the trust relationship 302). Accordingly, the lease management function 904, 1104 may be configured to establish a connection 465 with the bank server 160 (e.g., over the data network 120), so as to obtain financial transaction data 467 pertaining to the user from the bank 16. To do this, the lease management function 904, 1104 needs to obtain the user's account credentials (for their account at the bank 16). These credentials are obtained by prompting the user to enter their credentials 469 via an input device (e.g., the touchscreen 224) of the terminal 100. With these account credentials 469, the lease management function 904, 1104 is configured to access the bank server 160 to retrieve financial transaction data 467 pertaining to the user 10. This may be done on a limited-access basis using a financial data aggregation utility such as Flinks, available from Flinks Technology Inc., Montreal, Canada. As a result, the lease management function 904, 1104 may have access to all of the user's deposits and credits, including amounts and where they originate as well as all of the user's withdrawals and debits, as well as where they spent.

By applying a processing algorithm to the financial transaction data, the lease management function 904, 1104 may be configured to determine the credit worthiness of the user 10, which credit worthiness may be characterized by the likelihood of repayment of a loan of a certain size, or by the largest loan that can be made to the user 10 with a likelihood of repayment above a certain threshold, or by a score, or by other factors. The credit worthiness may also be characterized by an interest rate 463 (or a range of interest rates) that the lender 13 would charge the user 10. This interest rate 463 may vary as per the amount of money being loaned. It is noted that the interest rate 463 may reflect the credit worthiness of the user 10 in an inversely proportional fashion, i.e., the lower the credit worthiness of the user, the higher the interest rate 463 that will be charged.

Next, the lease management function 904, 1104 is configured to prompt the user 10 to identify the vehicle that the user 10 wishes to lease via an input device and the user interface controller 208 (e.g., via the touchscreen 224). The information entered by the user 10, denoted 471, could include the vehicle year, make, model and trim. Alternatively, the information 471 may include the vehicle's serial number (e.g., VIN), based on which the lease management function 904, 1104 is configured to consult the vehicle information server 150 to obtain the year, make and model of the vehicle (as decipherable from the VIN), and then further interaction with the user 10 is used to confirm the trim (e.g., between LX and EX, which may not be apparent from the VIN). Other information can be included in the information 471 entered by the user 10 such as mileage, condition and/or accessories (e.g., alarm system, trailer hitch, sound system, etc.). Based on this set of information regarding the selected vehicle, collectively referred to as the "vehicle profile", the lease management function 904, 1104 is configured to access an appraisal database (which can be hosted by the vehicle information server or another server) to obtain a market value 473 of the vehicle. The market value 473 of the selected vehicle represents an estimate of the amount of money that can be recovered by the lender 13 (who will keep title to the vehicle that it leases to the user 10) by re-selling the vehicle on the open market in case of payment default by the user 10.

The lease management function 904, 1104 is further configured to prompt the user 10 to enter the price 477 of the selected vehicle, as well as the down payment 479 that the user proposes to make on the selected vehicle. In various embodiments, this information may also be entered via the touchscreen 224, either by entering a price and proposed down payment or by selecting the price and proposed down payment from pre-defined available options pre-stored in the memory 204 of the terminal 100. The price 477 may be obtained from the merchant 14 and/or from consulting the merchant server 140 using the terminal 100. The difference between the price 477 of the vehicle and the proposed down payment 479 is the capital loan amount, i.e., the amount of money that is to be loaned to the user 10 (which is lower than the amount that the user 10 will need to pay back due to the charging of interest).

One situation that may arise is where the market value 473 of the vehicle is close to (or even below) the capital loan amount. For example, a vehicle that has a market value of $7,500 is being advertised for $9,000 and the user 10 proposes to make a down payment of $1,000. This represents a scenario where the lender 13 is being asked to lend $8,000 for a vehicle that is only worth $7,500, which the lender 13 may judge too risky a proposition. As such, before determining a payment plan, the lease management function 904, 1104 may be configured to compare the capital loan amount to the market value 473. If the difference between the capital loan amount and the market value 473 is greater than a certain threshold amount (which could be negative), then the lease management function 904, 1104 may be configured to issue a request via the screen 220. Specifically, this may be a request that the capital loan amount be lowered (by increasing the proposed down payment 479 and/or reducing the price 477) or that a different vehicle be selected. It is noted that to avoid changes in price being made by the user without the merchant's knowledge, the lease management function 904, 1104 may be configured to validate any pricing information or pricing changes with the merchant 14 over a data connection 474 linking the lender server 130 and the merchant server 140. Another option may be to require a merchant representative 142 (e.g., an employee of the merchant 14) to validate revised pricing information.

Assuming now that the difference between the capital loan amount and the market value 473 of the selected vehicle is within an acceptable range (e.g., less than a predetermined threshold), the lease management function 904, 1104 is configured to determine a payment plan for the user to lease the vehicle, based at least in part on the price 477 of the vehicle, the proposed down payment 479 and the interest rate 463 that was selected for the user 10 (whose value may depend on the credit worthiness of the user 10). With reference to FIG. 12, the payment plan 1200 may be a data structure for storage in non-transitory memory and characterized by a set of parameters which may include a capital loan amount 1202, a periodic payment amount 1204, a payment period 1206 and/or a number of payments or term 1208. These quantities are tied together by the interest rate 463. The payment plan 1200 may be stored in the memory 604 of the lender server 130.

Specifically, by way of non-limiting example, the lease management function 904, 1104 may be configured to compute the periodic payment amount 1204 for a predefined payment period 1206 and a predefined number of payments or term 1208, based on the interest rate 463 and the capital loan amount 1202. For instance, the lease management function 904, 1104 may be configured to set the payment period 1206 to "monthly" and the term 1208 to 4 years (for a total of 48 payments). Well-known formulas can be applied to compute the resulting periodic payment amount 1204 for these variables using a desired interest rate 463. The lease management function 904, 1104 is configured to cause this information to be provided to the user 10 via the input-output interface of the terminal 100. Additional information can be provided as part of the payment plan, such as the proposed down payment 479.

The lease management function 904, 1104 is configured to then provide the user 10 with an opportunity to modify at least one parameter of the payment plan 1200 and fix others. In particular, the user may be provided with an opportunity to change the proposed down payment 479 (or capital loan amount 1202), the periodic payment amount 1204, the payment period 1206, the number of payments or the term 1208, while keeping some of the parameters fixed. A radio button 1230 or check box can be provided in association with each parameter to allow the user 10 to choose whether that parameter is to be fixed or free (modifiable by the user). Each of these changes is captured and processed by the lease management function 904, 1104 and results in a recalculation of the free parameters of the payment plan (i.e., those that were not set to fixed values). The lease management function 904, 1104 may thus be configured to determine a revised version of the payment plan. This interaction with the screen 220 provides the user 10 with flexibility in architecting a payment plan 1200 that suits the user 10, by modifying any of the aforementioned variables.

As mentioned above, certain parameters of the payment plan 1200 may be fixed to their current values while others can be changed. As such, multiple parameters may be changed. In each case, as long as there is a degree of freedom remaining, a revised payment plan 1200 may be recalculated. However, one parameter that cannot be changed by the user is the interest rate 463, as this is controlled by the lender 13, as determined based on the credit worthiness of the user 10. Nevertheless, it is noted that the interest rate 463 may be changed by the lease management function 904, 1104 depending on the changes made to the payment plan 1200 by the user. For example, if the term 1208 is extended or the periodic payment amounts 1204 are reduced, this could represent a greater risk for the lender 13, especially in an inflationary environment, and therefore a higher interest rate 463 may need to be charged by the lender. This is an example of a parameter of the payment plan that, although not changeable by the user 10, may be changeable by the lease management function 904, 1104.

By way of non-limiting example, if the user 10 decreases the payment period 1206 (e.g., from monthly to weekly) while keeping the term 1208 fixed (e.g., 4 years), then based on the decreased payment period 1206, the revised version of the payment plan 1200 may be characterized by a decrease in the periodic payment amount 1206, and an increase in the number of payments. Alternatively, if the user 10 decreases the periodic payment amount (e.g., from $384 to $300) while keeping the payment period fixed (e.g., monthly), then based on the decreased periodic payment amount, the revised version of the payment plan 1200 may be characterized by an increase in the number of payments and in the term.

Once the user 10 selects or agrees to the payment plan (which can be provided by an OK button 1250 in the user interface), the lease management function 904, 1104 is configured to continue with digital signing of documents to complete the commercial transaction. This includes the lease management function 904, 1104 being configured to generate contract documentation 482 for digital signature by the user 10 and the merchant representative 142. The contract documentation 482 may be stored in the memory 604 of the lender server 130. The contract documentation 482 can specify the parameters of the payment plan 1200 by which the user 10 agrees to abide and identifies the vehicle that the merchant 14 agrees to release to the user. The lease management function 904, 1104 may thus be configured to present the contract documentation 482 via the input-output interface of the terminal 100 so that it may be digitally signed by the user 10. In addition, the lease management function 904, 1104 can be configured to request the signature of the merchant representative 142 (either via the same input-output interface of the terminal 100 with the merchant representative 142 presenting themselves in front of the terminal 100 or by communicating with the merchant server 140 over the data network 120). In this way, both the user 10 and the merchant representative 142 are prompted to accept the terms of the contract documentation 482.

The lease management function 904, 1104 is configured to then send an electronic copy of the signed contract documentation to an email address of the user 10 and to an email address of the merchant 14. Thereafter, the merchant 14 obtains the down payment 479 from the user 10 and the lender 13 releases funds to the merchant 14, which can be the amount of the capital loan amount. In this way, the merchant 14 receives full compensation for the vehicle. Additionally, the lender 13 proceeds to start collecting payments from the user 10 based on the payment plan 1200 stipulated in the contract 482. In an alternative arrangement, the user 10 sends the down payment 479 to the lender 13 and the lender 13 wires funds to the merchant 14 in an amount that corresponds to the full price of the vehicle.

Additionally, the merchant server 140 communicates with the government agency server 180 to register the vehicle. This can be done by the merchant server 14 accessing the government agency server 180 over the data network 120 and providing the VIN and information about the user 10.

One aspect of the above process is to ensure a continuous presence of the user 10 at the terminal 100 throughout the lease transaction. This can help bolster enforceability of the contract documentation 482 that is ultimately signed digitally by the user 10. To this end, the lease management function 904, 1104 is configured to provide the user 10 with audiovisual playback for consumption by the user 10 during certain steps of the lease transaction. Accordingly, the lease management function 904, 1104 is configured to take in-progress images of the user 10 (e.g., using the camera 232) during the transaction sequence outlined above. The lease management function 904, 1104 is also configured for validating the continuous physical proximity of the user 10 to the terminal 100 during the transaction sequence. It is only if the validating is a success, that the lease management function 904, 1104 proceeds to digital signing of the contract documentation 482 to complete the lease transaction, otherwise the lease transaction may be aborted.

To validate the continuous physical proximity of the user 10 to the terminal 100, the lease management function 904, 1104 may be configured to determine, through image processing, that the in-progress images are of the same person throughout the leasing process. Alternatively, to validate the continuous physical proximity of the user 10 to the terminal 100, the lease management function 904, 1104 may be configured to determine that the in-progress images are of the user 10, which could involve a comparison of each in-progress image with the initial image of the user (e.g., taken when validating the document 402). In yet another alternative embodiment, to validate the continuous physical proximity of the user 10 to the terminal 100, the lease management function 904, 1104 may be configured to determine that the in-progress images and the initial image are of the same person, without necessarily requiring a comparison with the past image 406 on the document submitted initially for identity verification.

One reason for the desirability of ensuring a continuous presence of the user 10 throughout the lease transaction is to ensure that the user 10 is provided with, and implicitly acknowledges (due to their physical proximity to the terminal 100), information pertaining to the contract documentation 482 and its legalities. This could reduce the likelihood that the user 10 could successfully argue, against the merchant 14 or the lender 13, that the user 10 was not informed of certain terms or conditions of the contract documentation 482. Accordingly, certain steps of the transaction sequence may include the lease management function 904, 1104 providing the user with audiovisual playback via the display 222 and the loudspeaker 224 of the terminal 100. As such, as the lease management function 904, 1104 guides the user 10 through the lease transaction, videos or audio tracks can be played back at key moments where this information is required to be presented to the user 10. It is also around these moments, that the in-progress images can be taken.

In accordance with a non-limiting embodiment, the lease management function 904, 1104 may be configured to cause the loudspeaker 240 and/or the video display 222 to output the audiovisual playback for consumption by the user 10. The audiovisual playback could comprise different videos stored in the memory 204 of the terminal 100 (or the memory 604 of the lender server 130), each of which may be associated with a different step of the lease transaction. The lease management function 904, 1104 may be configured to allow the user to pause or replay the videos but not to skip forward through the videos. In order to increase the chances that the audio will be heard by the user 10 suitably positioned via-s-vis the screen 220 of the terminal 100, the lease management function 904, 1104 may force the sound emanating loudspeaker to be at a certain minimum audible volume. The terminal 100 may also be equipped with a volume control 266 to allow the user 10 to adjust the volume but to prevent audio of the audiovisual playback from being shut off or from going below a certain minimum level.

Those skilled in the art will appreciate that the lease management function 904, 1104 may be configured to determine periodically whether the user 10 is within a suitable orientation relative to the display 222, from which it is inferred that the user 10 is exposed to the video playback. This determination can be done from taking an in-progress image via the camera 232. For example, if the user's eyes 10B are within a certain portion of the field of view of the camera 232, the user is considered to be looking at the video display 222. Since the lease management function 904, 1104 can have control over the audio volume, knowledge that the user 10 or the user's head 10A is within a pre-determined volume or region 1000 relative to the screen 220 can be used to confirm that the user 10 is indeed watching the video and listening to what is being said or played back. A periodic confirmation that the user 10 acknowledges or understands may be requested via the input-output interface (such as via the touchscreen 224), or the user 10 may be asked to repeat something that was said during playback of the audiovisual content via a microphone (not shown). If it is determined that the user's head 10A is outside a predetermined region 1000 (or, e.g., if the user's eyes cannot be captured by the in-progress images), then the lease management function 904, 1104 may be configured to repeat the most recently started audiovisual track/message, or to abort the commercial transaction altogether.

It should also be appreciated that the camera 232 can be used to record the user 10, including record the user's watching of the videos presented to the user 10 during the transaction sequence. This will make it difficult for the user 10 to eventually argue that the user 10 did not watch the videos, which makes the transaction process more efficient as it is less likely to be contested at a later date. This results in fewer resources being expended by the lending entity 13 defending contracts in court.

In some embodiments, the credit worthiness may be attributed a score and the lender 13 may specialize in leasing vehicles to individuals with a score falling within a certain range. When the user 10 is determined to have a score outside the range, this could be indicative of the user being more suited to a loan from a different financial institution (an auxiliary lender). For example, if the user is determined to have a score below the lower bound of the range, this could be indicative of the user being unable to qualify for a loan from the lender but potentially able to qualify from an auxiliary lender 313 specializing in high-risk loans (which may charge a higher interest rate than the lender). In contrast, if the user is determined to have a score above the upper bound of the range, this could be indicative of the user being able to qualify for a loan from a more risk-averse auxiliary lender 313 such as a conventional bank (which may charge a lower interest rate than the lender). In either case, and with reference to FIG. 13, the lease management function 904, 1104 may provide the user 10 with an opportunity to agree (via the user interface/touchscreen 224) to a loan from the auxiliary lender 313 (possibly while displaying the interest that is charged by the auxiliary lender); in other cases, the lease management function 904, 1104 may be configured to provide the user 10 with an opportunity to select (via the user interface/touchscreen 224) the auxiliary lender 313 from a plurality of lending institutions (possibly while displaying the interest that is charged by such lending institutions). Either way, upon the user 10 entering a selection of an auxiliary lender 313 into the user interface/touchscreen 224 (e.g., via a selection button 1310), the lease management function 904, 1104 may be configured to consummate the lease transaction on behalf of the auxiliary lender 313, which can be accomplished in part based on a pre-existing trust relationship 305 between the lender 13 and the auxiliary lender 313 (see FIG. 3). This includes the lease management function 904, 1104 determining the payment plan 1200 based on the interest rate charged by the auxiliary lender. The interest rate charged b the auxiliary lender may be stored in the memory 604 of the lender server 130 but may be different from the interest rate 463 charged by the lender 13. In order to carry out this service, the lender 13 may charge a fee to the auxiliary lender 313, which could be a fixed fee or may be in the form of a commission on the capital loan amount, for example.

In some embodiments, the lease management function 904, 1104 may execute a navigation function (e.g., a web browser), which would allow the user 10 to browse and select vehicles based on interactions with the terminal 10 through the input-output interface, including the touchscreen 224.

Figure 5A:
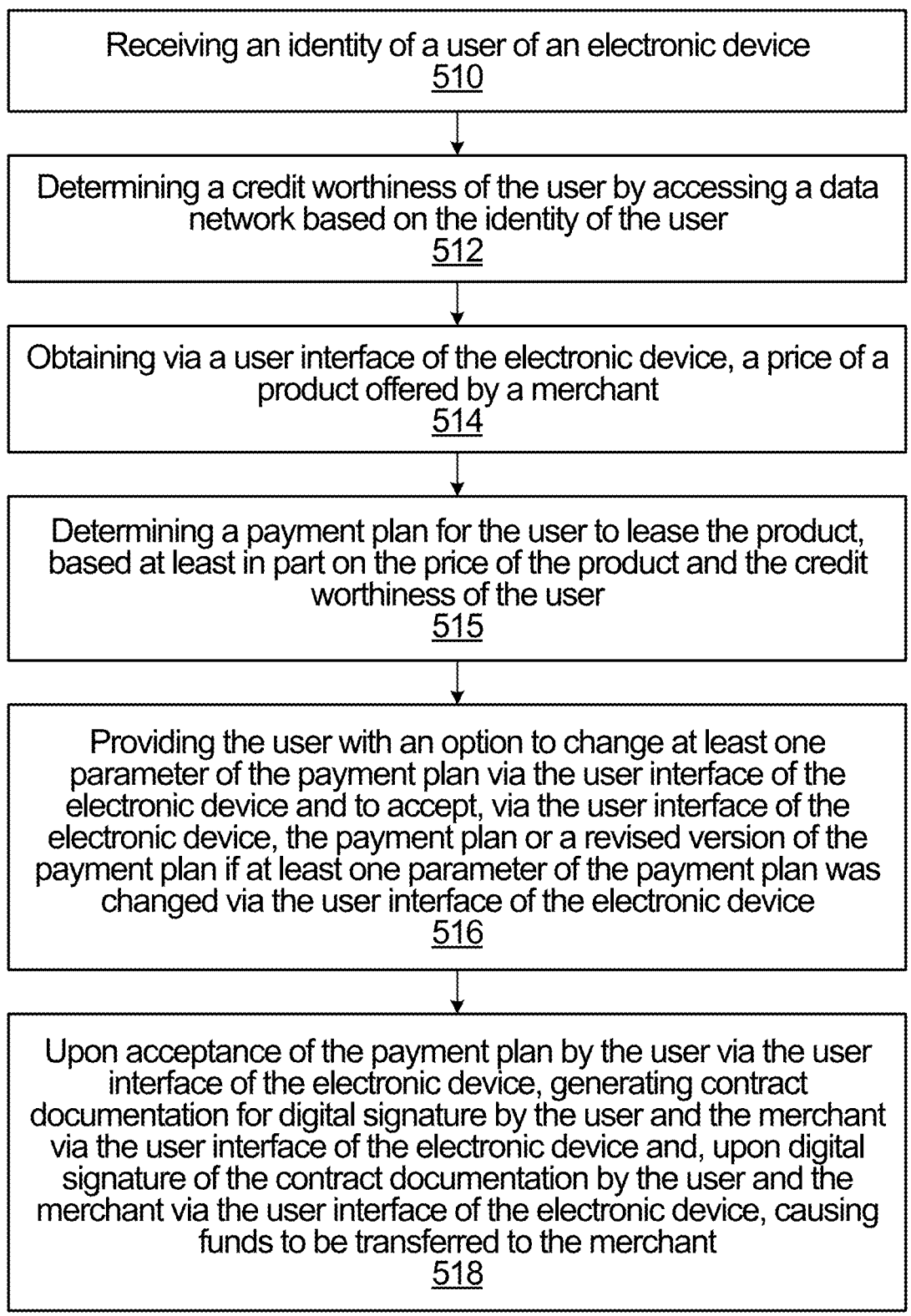
FIGS. 5A and 5B are flowcharts of two non-limiting example methods enabled by embodiments of the present disclosure.
Figure 5B:
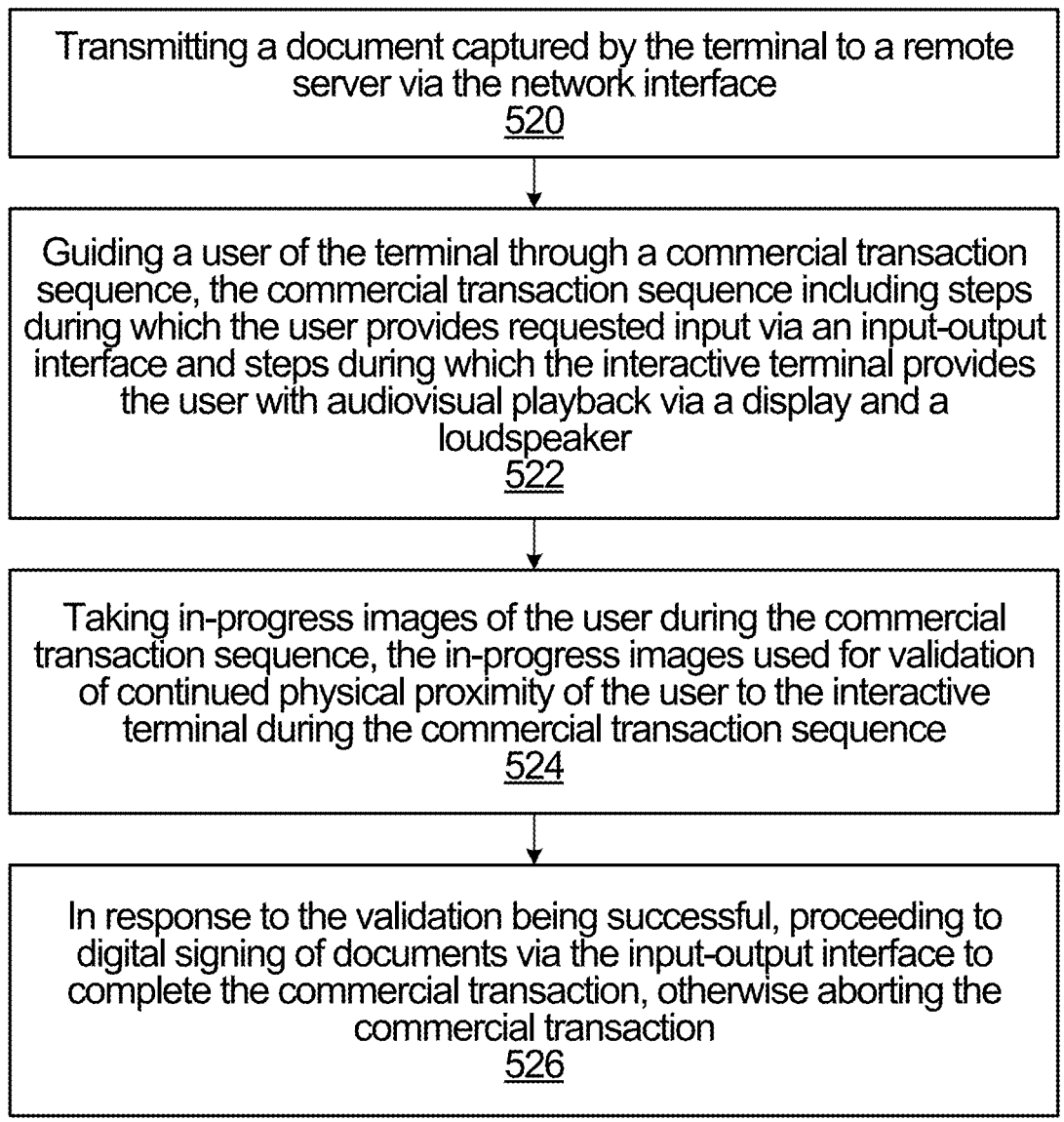

In view of the foregoing, various methods are enabled by the embodiments disclosed herein. Reference is made to FIGS. 5A and 5B, which are flowcharts of two non-limiting example methods enabled by embodiments of the present disclosure. FIG. 5A illustrates a method of operating at least one computer to facilitate product leasing, with steps 510-518. FIG. 5B illustrates a method of operating a terminal, with steps 520-526.

Aspects of the present disclosure have been described with reference to flowcharts and block diagrams of methods and apparatus (systems), according to various embodiments. It will be understood that each block of the flowcharts and block diagrams, and combinations of such blocks, can be implemented by execution of the program instructions. Namely, the program instructions, which are read and processed by the processor of the terminal or the processor of various servers, direct the respective processor to implement the functions/acts specified in the flowchart and/or block diagram block or blocks. It will also be noted that each block of the flowcharts and/or block diagrams, and combinations of such blocks, can also be implemented by special purpose hardware-based systems that perform the specified functions or acts or carry out combinations of special purpose hardware and computer instructions.

The flowcharts and block diagrams illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It should be appreciated that throughout the specification, discussions utilizing terms such as "processing", "computing", "calculating", "determining", "analyzing" or the like, can refer to the action and/or processes of a computer or computing system, or similar electronic computing device, that manipulate and/or transform data represented as physical, such as electronic, quantities into other data similarly represented as physical quantities.

As used herein, unless otherwise specified, the use of the ordinal adjectives "first", "second", "third", etc., to describe a common object or step, merely indicate that different instances of like objects or steps are being referred to, and are not intended to imply that the objects or steps so described must be in a given sequence, either temporally, spatially, in ranking, or in any other manner.

It is noted that various individual features may be described only in the context of one embodiment. The particular choice for description herein with regard to a single embodiment is not to be taken as a limitation that the particular feature is only applicable to the embodiment in which it is described. Various features described in the context of one embodiment described herein may be equally applicable to, additive, or interchangeable with other embodiments described herein, and in various combinations, groupings or arrangements. In particular, use of a single reference numeral herein to illustrate, define, or describe a particular feature does not mean that the feature cannot be associated or equated to another feature in another drawing figure or description.

Also, when the phrase "at least one of A and B" is used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables.

A computer-readable storage medium, as used herein, does not include transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The foregoing description and accompanying drawings illustrate the principles and modes of operation of certain embodiments. However, these embodiments should not be considered limiting. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

What is claimed is:

1. An interactive terminal, comprising:
a camera for taking images of a user of the interactive terminal;
a document capture system for receiving identity documentation from the user;
an input-output interface to allow the user to enter information;
a display;
a loudspeaker;
a volume control for allowing the user to adjust the volume of audio but preventing the audio from being inaudible;
a network interface configured for communication with a remote computing entity; and
a processing entity operatively coupled to the camera, the document capture system, the input-output interface, the display, the loudspeaker and the network interface, configured for:
transmitting a document captured by the document capture system to a remote server via the network interface;
guiding the user through a transaction sequence, the transaction sequence including steps during which the user provides requested input via the input-output interface and steps during which the interactive terminal provides the user with audiovisual playback via the display and the loudspeaker;
taking in-progress images of the user with the camera during the transaction sequence, the in-progress images used for validation of continued physical proximity of the user to the interactive terminal during the transaction sequence; and
in response to the validation being successful, proceeding to digital signing of documents via the input-output interface to complete the transaction.

2. The interactive terminal defined in claim 1, further comprising a power source that includes at least one battery, for powering the interactive terminal.

3. The interactive terminal defined in claim 1, wherein the network interface is configured to communicate with the remote server over a data network via a wireless link.

4. The interactive terminal defined in claim 1, wherein the network interface is configured to communicate with the remote server over a data network via a satellite link.

5. The interactive terminal defined in claim 1, wherein the processing entity is further configured to abort the transaction in response to the validation not being successful.

6. The interactive terminal defined in claim 1, wherein the processing entity is configured to send the in-progress images to the remote server via the network interface, the validation being carried out at the remote server.

7. The interactive terminal defined in claim 6, wherein the processing entity is configured to receive from the remote server an indication of whether the validation was successful.

8. The interactive terminal defined in claim 1, further comprising a tamper detection system to detect and signal attempts to tamper with the interactive terminal.

9. The interactive terminal defined in claim 1, wherein the volume control is configured to maintain the volume of the audio above a predetermined minimum level.

10. The interactive terminal defined in claim 1, wherein the display is configured to generate video that is visible to a seeing user when in a certain range of positions relative to the display and wherein the loudspeaker is configured to convey audio that is audible to a hearing user when in the certain range of positions.

11. The interactive terminal defined in claim 1, wherein the display is configured to display video that is not visible to a seeing user when the user is outside a certain range of positions relative to the display, wherein the processing entity is configured to play an audiovisual track and to determine from the in-progress images whether the user is inside or outside the certain range of positions.

12. The interactive terminal defined in claim 1, wherein the display comprises a screen privacy filter.

13. The interactive terminal defined in claim 1, wherein the document capture system comprises a scanner.

14. The interactive terminal defined in claim 1, wherein the processing entity is configured to validate a candidate document submitted to the document capture system.

15. The interactive terminal defined in claim 14, wherein the processing entity is configured to request submission of a new document if the candidate document is not successfully validated.

16. The interactive terminal defined in claim 14, wherein to validate the candidate document, the processing entity is configured to determine whether the candidate document is a government-issued document.

17. The interactive terminal defined in claim 1, wherein the document transmitted to the remote server comprises a scan of a passport or driver's license.

18. The interactive terminal defined in claim 1, wherein the transaction comprises lease by the user of a vehicle made available by a merchant.

19. The interactive terminal defined in claim 1, wherein the input-output interface comprises a touchscreen including a digital keyboard.

20. The interactive terminal defined in claim 19, wherein the display is integrated within the touchscreen.

21. The interactive terminal defined in claim 1, wherein the guiding is carried out based on instructions received from the remote server.

22. The interactive terminal defined in claim 1, further comprising a position determining system to determine a position of the interactive terminal and to send the position to the remote server via the network interface.

23. A method of operating a terminal, comprising:
transmitting a document captured by the terminal to a remote server via the network interface;
guiding a user of the terminal through a transaction sequence, the transaction sequence including steps during which the user provides requested input via an input-output interface and steps during which the terminal provides the user with audiovisual playback via a display and a loudspeaker;
enabling the user to adjust a volume of audio during the transaction sequence but preventing the audio from being inaudible;
taking in-progress images of the user during the transaction sequence using a camera, the in-progress images used for validation of continued physical proximity of the user to the terminal during the transaction sequence using a processing entity coupled to the camera; and
in response to the validation being successful, proceeding to digital signing of documents via the input-output interface to complete the transaction, otherwise aborting the transaction.

24. A computer-implemented user interface method for validating user presence during a transaction, comprising:
capturing via a document capture system (i) an identity of a user of an electronic device and (ii) an initial image of the user;
guiding the user through a transaction sequence, the transaction sequence including steps during which the user provides requested input into the electronic device and steps during which the electronic device provides the user with audiovisual playback for consumption by the user;
enabling the user to adjust a volume of audio during the transaction sequence but preventing the audio from being inaudible;
taking in-progress images of the user during the transaction sequence using a camera;
validating continuous physical proximity of the user to the electronic device during the transaction sequence using a processing entity coupled to the camera; and
based on the validating being successful, proceeding to digital signing of documents to complete the transaction.

* * * * *